(12) United States Patent
Zhou et al.

(10) Patent No.: US 12,289,731 B2
(45) Date of Patent: Apr. 29, 2025

(54) TECHNIQUES FOR JOINT SIDELINK RELAY SCHEDULING DOWNLINK CONTROL INFORMATION

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 17/445,033

(22) Filed: Aug. 13, 2021

(65) Prior Publication Data

US 2023/0049962 A1 Feb. 16, 2023

(51) Int. Cl.
*H04W 72/23* (2023.01)
*H04L 1/1867* (2023.01)
*H04W 72/044* (2023.01)
*H04W 72/1263* (2023.01)
*H04W 72/20* (2023.01)

(52) U.S. Cl.
CPC .......... *H04W 72/23* (2023.01); *H04L 1/1896* (2013.01); *H04W 72/044* (2013.01); *H04W 72/1263* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2016/0198455 A1* | 7/2016 | Caretti | H04W 72/21 370/329 |
| 2018/0146494 A1* | 5/2018 | Khoryaev | H04W 76/15 |
| 2018/0206176 A1* | 7/2018 | Panteleev | H04W 28/04 |
| 2018/0213379 A1* | 7/2018 | Xiong | H04W 4/70 |
| 2019/0124631 A1* | 4/2019 | Ren | H04L 5/0048 |
| 2020/0163155 A1* | 5/2020 | Lee | H04L 5/0053 |
| 2020/0259600 A1* | 8/2020 | Cao | H04L 1/0077 |
| 2020/0412485 A1* | 12/2020 | Wang | H04L 1/0073 |
| 2021/0127396 A1* | 4/2021 | Su | H04L 5/0094 |
| 2021/0144781 A1* | 5/2021 | Xu | H04W 24/02 |
| 2021/0298121 A1* | 9/2021 | Zhang | H04L 1/1812 |
| 2022/0095304 A1* | 3/2022 | Muruganathan | H04W 72/0453 |
| 2022/0400508 A1* | 12/2022 | Oteri | H04W 72/23 |
| 2023/0171826 A1* | 6/2023 | Selvanesan | H04W 76/14 370/310 |
| 2023/0217435 A1* | 7/2023 | Gao | H04L 27/2662 370/329 |
| 2023/0291510 A1* | 9/2023 | Singh | H04L 1/1887 |

* cited by examiner

*Primary Examiner* — Phirin Sam
(74) *Attorney, Agent, or Firm* — Dalei Dong; Harrity & Harrity, LLP

(57) ABSTRACT

Various aspects of the present disclosure generally relate to wireless communication. In some aspects, a relay user equipment (UE) may receive, from a base station, a downlink control information (DCI) message scheduling a first transmission between a source node and the relay UE and a second transmission between the relay UE and a destination node. The UE may transmit, to the base station, at least one of: feedback regarding at least one of the first transmission or the second transmission, or the second transmission. Numerous other aspects are described.

30 Claims, 16 Drawing Sheets

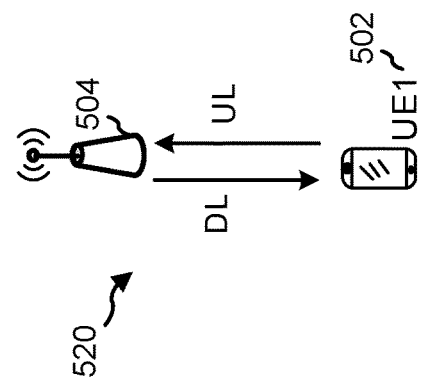
FIG. 5B
FIG. 5C
FIG. 5A

TECHNIQUES FOR JOINT SIDELINK RELAY SCHEDULING DOWNLINK CONTROL INFORMATION

FIELD OF THE DISCLOSURE

Aspects of the present disclosure generally relate to wireless communication and to techniques and apparatuses for joint sidelink relay scheduling downlink control information (DCI).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a relay user equipment (UE). The method may include receiving, from a base station, a downlink control information (DCI) message scheduling a first transmission between a source node and the relay UE and a second transmission between the relay UE and a destination node. The method may include transmitting, to the base station, at least one of feedback regarding at least one of the first transmission or the second transmission, or the second transmission.

Some aspects described herein relate to a method of wireless communication performed by a base station. The method may include transmitting a DCI message scheduling a first transmission between a source node and a relay UE and a second transmission between the relay UE and a destination node. The method may include receiving, from the relay UE, at least one of at least one of feedback regarding at least one of the first transmission or the second transmission, or the second transmission.

Some aspects described herein relate to an apparatus for wireless communication at a relay UE. The apparatus may include a memory. The apparatus may include one or more processors, coupled to the memory, configured to receive, from a base station, a DCI message scheduling a first transmission between a source node and the relay UE and a second transmission between the relay UE and a destination node; and transmit, to the base station, at least one of feedback regarding at least one of the first transmission or the second transmission, or the second transmission.

Some aspects described herein relate to an apparatus for wireless communication at a base station. The apparatus may include a memory. The apparatus may include one or more processors, coupled to the memory, configured to transmit a DCI message scheduling a first transmission between a source node and a relay UE and a second transmission between the relay UE and a destination node; and receive, from the relay UE, at least one of feedback regarding at least one of the first transmission or the second transmission, or the second transmission.

Some aspects described herein relate to a non-transitory computer-readable medium that stores a set of instructions for wireless communication by a relay UE. The set of instructions, when executed by one or more processors of the UE, may cause the UE to receive, from a base station, a DCI message scheduling a first transmission between a source node and the relay UE and a second transmission between the relay UE and a destination node. The set of instructions, when executed by one or more processors of the UE, may cause the UE to transmit, to the base station, at least one of feedback regarding at least one of the first transmission or the second transmission, or the second transmission.

Some aspects described herein relate to a non-transitory computer-readable medium that stores a set of instructions for wireless communication by a base station. The set of instructions, when executed by one or more processors of the base station, may cause the base station to transmit a DCI message scheduling a first transmission between a source node and a relay UE and a second transmission between the relay UE and a destination node. The set of instructions, when executed by one or more processors of the base station, may cause the base station to receive, from the relay UE, at least one of feedback regarding at least one of the first transmission or the second transmission, or the second transmission.

Some aspects described herein relate to an apparatus for wireless communication. The apparatus may include means for receiving, from a base station, a DCI message scheduling a first transmission between a source node and the relay UE and a second transmission between the relay UE and a destination node. The apparatus may include means for transmitting, to the base station, at least one of feedback regarding at least one of the first transmission or the second transmission, or the second transmission.

Some aspects described herein relate to an apparatus for wireless communication. The apparatus may include means for transmitting a DCI message scheduling a first transmission between a source node and a relay UE and a second transmission between the relay UE and a destination node. The apparatus may include means for receiving, from the relay UE, at least one of feedback regarding at least one of the first transmission or the second transmission, or the second transmission from the relay UE.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating examples of full duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
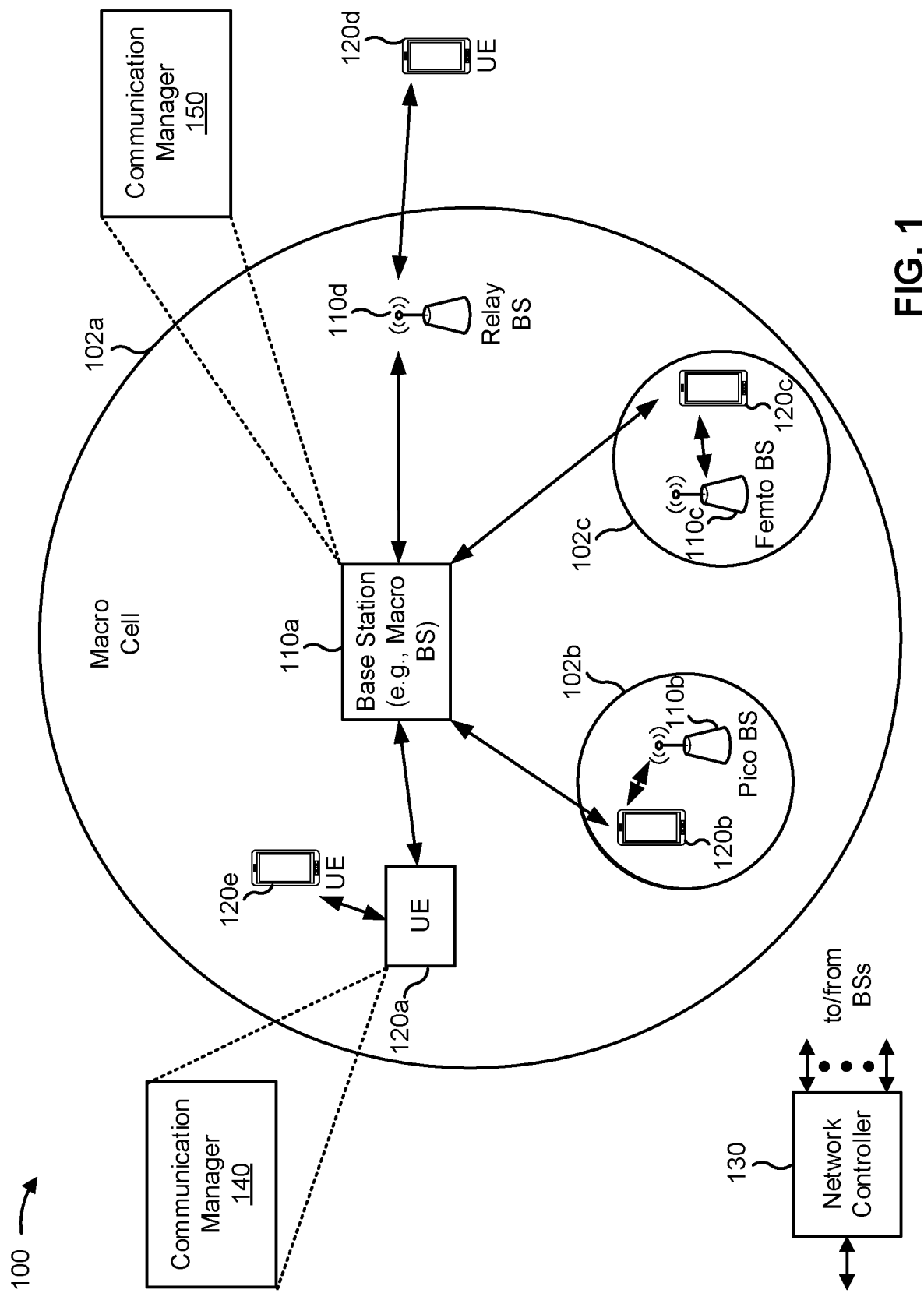
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a DCI message scheduling a first transmission between a source node and the relay UE and a second transmission between the relay UE and a destination node; and transmit, to the base station, at least one of: feedback regarding at least one of the first transmission or the second transmission, or the second transmission. Additionally, or alternatively, the communication manager 140 may perform one or more other operations described herein.

In some aspects, the base station 110 may include a communication manager 150. As described in more detail elsewhere herein, the communication manager 150 may transmit a DCI message scheduling a first transmission between a source node and a relay UE and a second transmission between the relay UE and a destination node; and receive, from the relay UE, at least one of: feedback regarding at least one of the first transmission or the second transmission, or the second transmission from the relay UE. Additionally, or alternatively, the communication manager 150 may perform one or more other operations described herein.

As indicated above, FIG. 1 is provided as an example. Other examples may differ from what is described with regard to FIG. 1.

Figure 2:
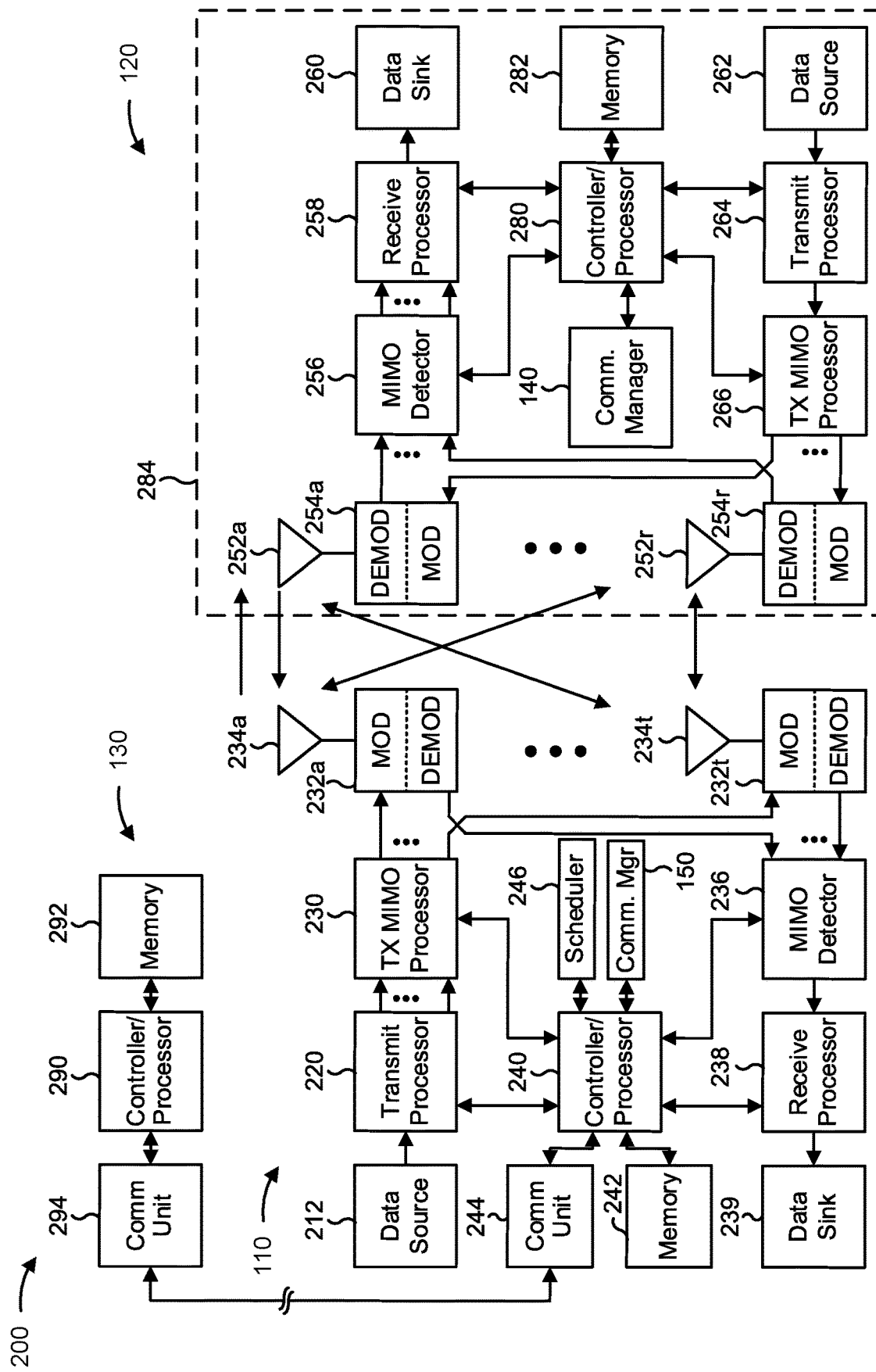
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-16).

The controller/processor 240 of the base station 110, the controller/processor 280 of the UE 120, and/or any other component(s) of FIG. 2 may perform one or more techniques associated with joint sidelink relay scheduling downlink control information (DCI), as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE 120 includes means for receiving, from a base station, a DCI message scheduling a first transmission between a source node and the relay UE and a second transmission between the relay UE and a destination node; and/or means for transmitting, to the base station, at least one of: feedback regarding at least one of the first transmission or the second transmission, or the second transmission. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a DCI message scheduling a first transmission between a source node and a relay UE and a second transmission between the relay UE and a destination node; and/or means for receiving, from the relay UE, at least one of: feedback regarding at least one of the first transmission or the second transmission, or the second transmission from the relay UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
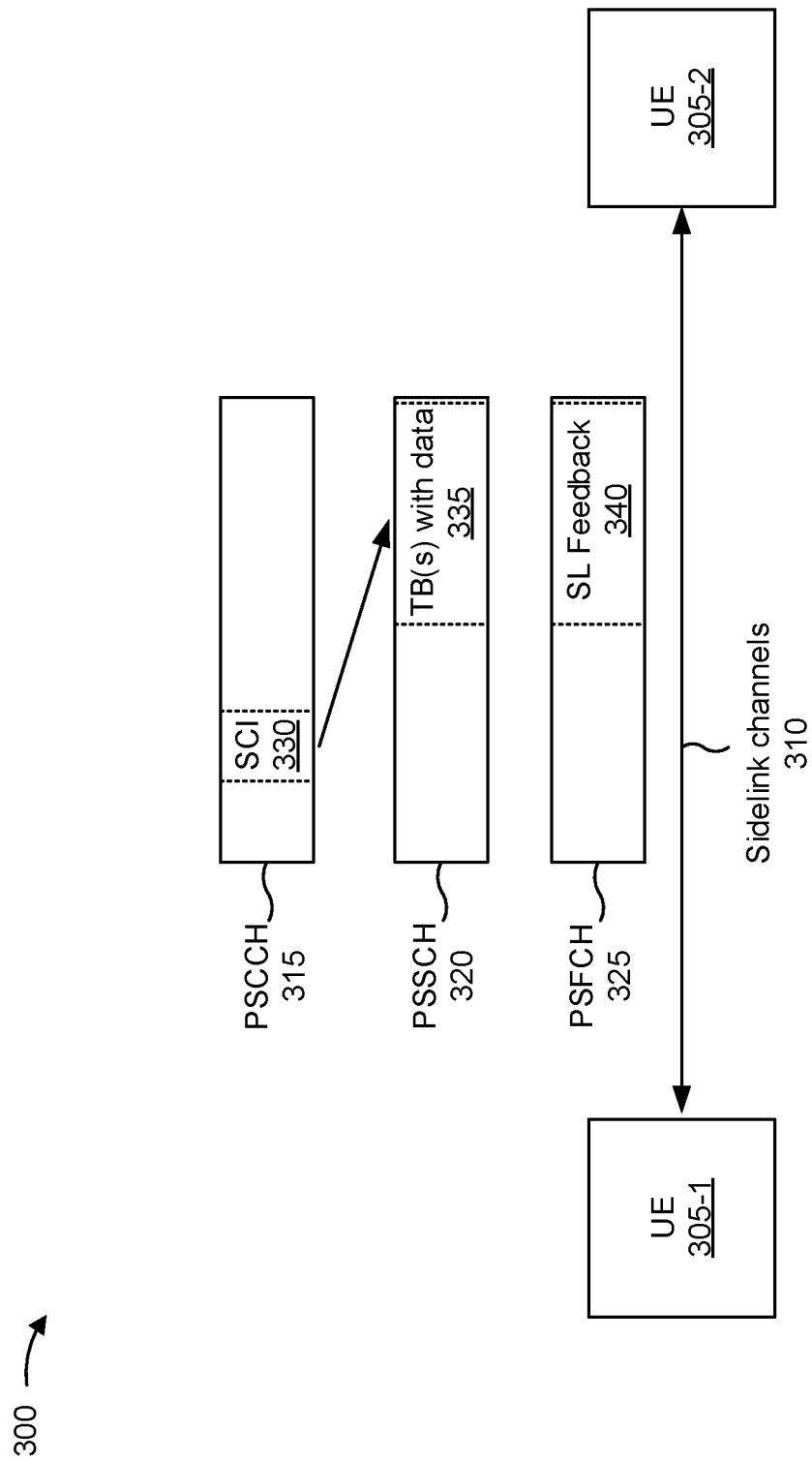
FIG. 3 is a diagram illustrating an example of sidelink communications, in accordance with the present disclosure

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
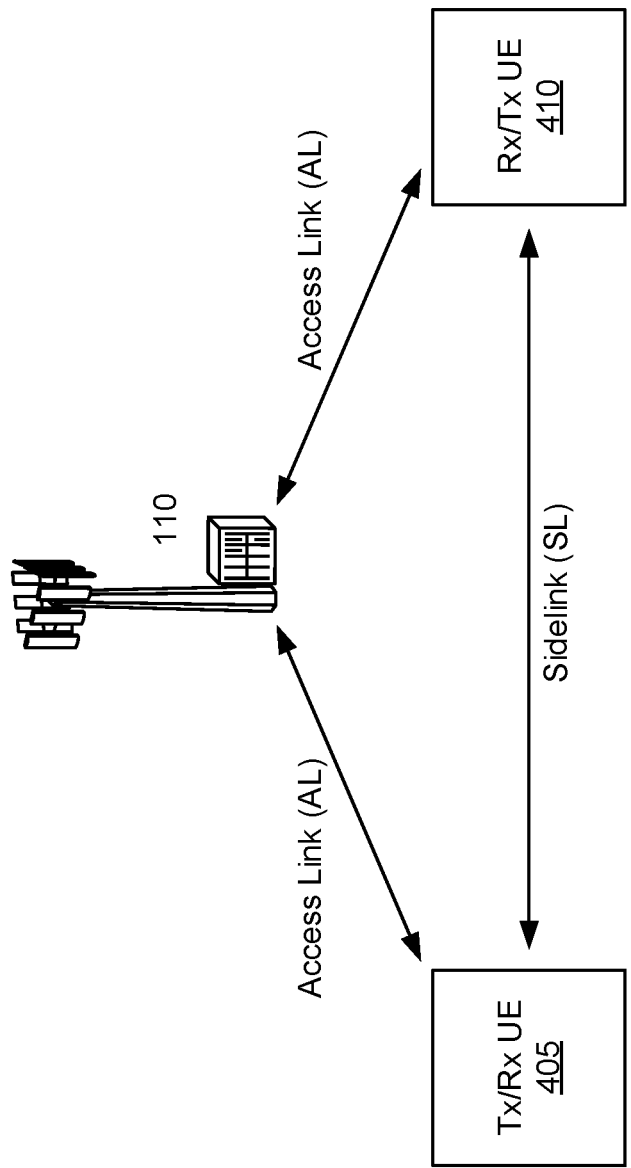
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. An access link may be referred to herein as a radio access link, a Uu link, or a Uu interface link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, one or more of the UEs 405 and 410 may be out of coverage of the BS 110. An out-of-coverage UE is a UE that does not have an access link with the BS 110. Communications between an out-of-coverage UE and a BS 110 may be facilitated by a relay UE, as described in more detail in connection with FIG. 6. The techniques and apparatuses described herein provide a single DCI message scheduling multiple communications on multiple links, such as full-duplex communications on a radio access link and a sidelink or two sidelinks, or half-duplex communications on a radio access link and a sidelink or two sidelinks.

As indicated above, FIG. 4 is provided as an example. Other examples may differ from what is described with respect to FIG. 4.

FIGS. 5A-5C are diagrams illustrating examples 500, 510, 520 of full duplex (FD) communication in accordance with the present disclosure. The example 500 of FIG. 5A includes a UE1 502 and two base stations (e.g., TRPs) 504-1, 504-2, where the UE1 502 is sending UL transmissions to base station 504-1 and is receiving DL transmissions from base station 504-2. In the example 500 of FIG. 5A, FD is enabled for the UE1 502, but not for the base stations 504-1, 504-2. The example 510 of FIG. 5B includes two UEs, shown as UE1 502-1 and UE2 502-2, and a base station 504, where the UE1 502-1 is receiving a DL transmission from the base station 504 and the UE2 502-2 is transmitting an UL transmission to the base station 504. In the example 510 of FIG. 5B, FD is enabled for the base station 504, but not for UE1 502-1 and UE2 502-2. The example 520 of FIG. 5C includes a UE1 502 and a base station 504, where the UE1 502 is receiving a DL transmission from the base station 504 and the UE1 502 is transmitting an UL transmission to the base station 504. In the example 520 of FIG. 5C, FD is enabled for both the UE1 502 and the base station 504. A wireless communication device for which FD is enabled is referred to herein as being in an FD mode, and if FD is not enabled for a wireless communication device, the wireless communication device is referred to as being in a half duplex (HD) mode. Whether a wireless communication device is in an FD mode or an HD mode can change from communication to communication and from time resource to time resource. For example, even within a given transmission, a wireless communication device may be in an FD mode at some times and an HD mode at other times.

As indicated above, FIGS. 5A-5C are provided as one or more examples. Other examples may differ from what is described with regard to FIGS. 5A-5C.

Figure 6:
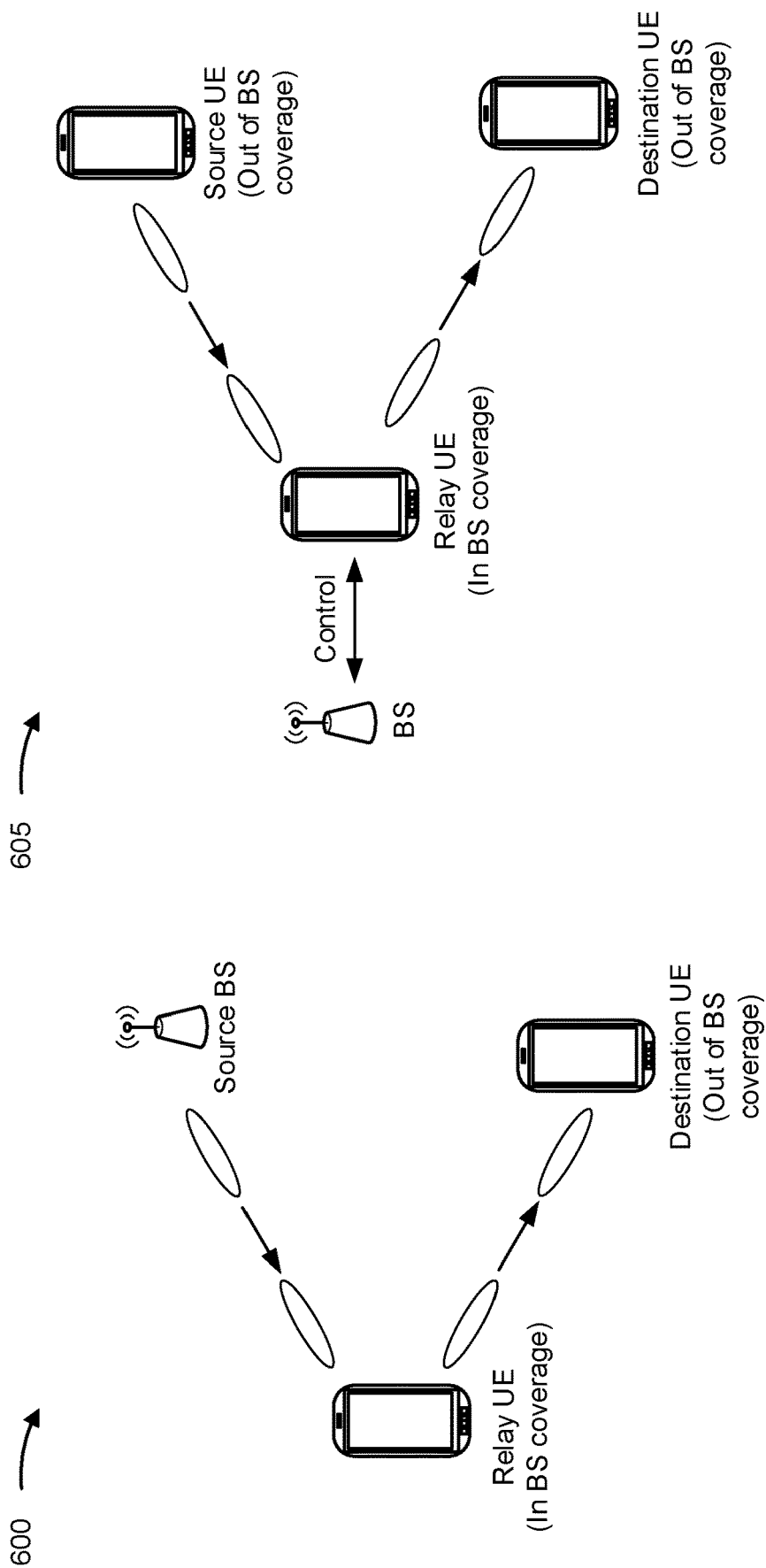
FIG. 6 is a diagram illustrating examples of relaying communications between a source wireless node and a destination wireless node via a relay UE, in accordance with the present disclosure.

FIG. 6 is a diagram illustrating examples 600 and 605 of relaying communications between a source wireless node and a destination wireless node via a relay UE, in accordance with the present disclosure. A source wireless node is a wireless communication device (e.g., UE 120, UE 305, UE 405, UE 410, UE 502, BS 110, or another wireless communication device) that transmits a communication to be relayed by a relay UE (e.g., UE 120, UE 305, UE 405, UE 410, UE 502). A destination wireless node is a wireless communication device (e.g., UE 120, UE 305, UE 405, UE 410, UE 502, BS 110, or another wireless communication device) that receives the communication from the relay UE.

Example 600 is an example where the source wireless node is a BS (shown as "Source BS") and the destination wireless node is a UE (shown as "Destination UE"). In example, 600, the relay UE is in coverage of the BS and the destination UE is out of coverage of the BS. The relay UE may have a radio access link (e.g., a Uu link) with the BS. The relay UE may have a sidelink with the destination UE. A communication may be relayed from the BS to the destination UE by the relay UE. In some aspects, the relay UE may handle scheduling of the relayed communication to the destination UE by transmitting SCI to the destination UE. In some aspects, the BS may handle scheduling of the relayed communication to the relay UE and/or to the destination UE, such as by transmitting DCI to the relay UE scheduling a first transmission to the relay UE. The DCI may also carry information for the relay UE to schedule a second transmission to the destination UE, as described in more detail elsewhere herein.

In some aspects, the destination wireless node is a BS (not shown in FIG. 6) and the source wireless node is a UE (not shown in FIG. 6). In such aspects, the relay UE may be in coverage of the BS, and the source UE is out of coverage of the BS. The relay UE may have a radio access link (e.g., a Uu link) with the BS. The relay UE may have a sidelink with the source UE. A communication may be relayed from the source UE to the BS by the relay UE. In some aspects, the relay UE may handle scheduling of the relayed communication from the destination BS by transmitting SCI to the source UE. In some aspects, the BS may handle scheduling of the relayed communication from the relay UE and/or the source UE, such as by transmitting DCI to the relay UE carrying information for the relay UE to schedule a first transmission to the relay UE from the source UE, as described in more detail elsewhere herein. The DCI may also schedule a second transmission from the relay UE to the BS.

Example 605 is an example where the BS is not the source node or the destination node. In example 600, the relay UE is in coverage of the BS, and neither the source node (shown as "Source UE") nor the destination node (shown as "Destination UE") are in coverage of the BS. The relay UE may have a radio access link with the BS. The relay UE may have a sidelink with the source UE. The relay UE may have a sidelink with the destination UE. The BS may schedule a first transmission from the source UE to the relay UE and a second transmission from the relay UE to the destination UE. For example, according to the techniques and apparatuses described herein, the BS may transmit a single DCI message including scheduling information for the first transmission and the second transmission. In some aspects, one or more of the UEs of FIG. 6 (in example 600 or example 605) may communicate in an FD mode. In some aspects, one or more of the UEs of FIG. 6 (in example 600 or example 605) may communicate in an HD mode.

As indicated above, FIG. 6 is provided as an example. Other examples may differ from what is described with regard to FIG. 6.

Full-duplex (FD) communication enables more efficient utilization of communication resources and increased throughput relative to HD communication. Furthermore, sidelink relaying enables improved coverage for UEs which may be out of coverage of a BS. FD communication and sidelink relaying both involve the scheduling of multiple communications. For example, FD communication may involve the scheduling of multiple simultaneous communications for a UE. As another example, sidelink relaying may involve the scheduling of a first transmission from a source node to a relay UE and a second transmission from the relay UE to a destination node. Furthermore, in some cases, FD communication and sidelink relaying may be combined with each other, as described in more detail elsewhere herein. The usage of FD communication and/or sidelink relaying may increase the number of communications scheduled in a given time window relative to HD communication and/or non-relayed communications. Providing separate DCI messages for each communication of FD communications and/or sidelink relaying may involve significant overhead, thereby decreasing throughput.

Some techniques and apparatuses described herein provide DCI scheduling of multiple transmissions. For example, a single DCI message may schedule multiple simultaneous transmissions at a UE in an FD mode, such as a relay UE of a sidelink relaying configuration. As another example, a single DCI message may schedule (or carry information to facilitate scheduling of) multiple transmissions for sidelink relaying, such as a first transmission from a source node to a relay UE and a second transmission from the relay UE to a destination node. The single DCI message may reduce overhead relative to transmitting respective DCI messages to schedule (or facilitate scheduling of) each communication of a UE in an FD mode and/or a sidelink relaying configuration. Thus, overhead is reduced, and throughput is increased.

The operations described herein as performed by a relay UE can also be performed by a UE (e.g., UE 120) that is not associated with a sidelink relaying operation.

Figure 7:
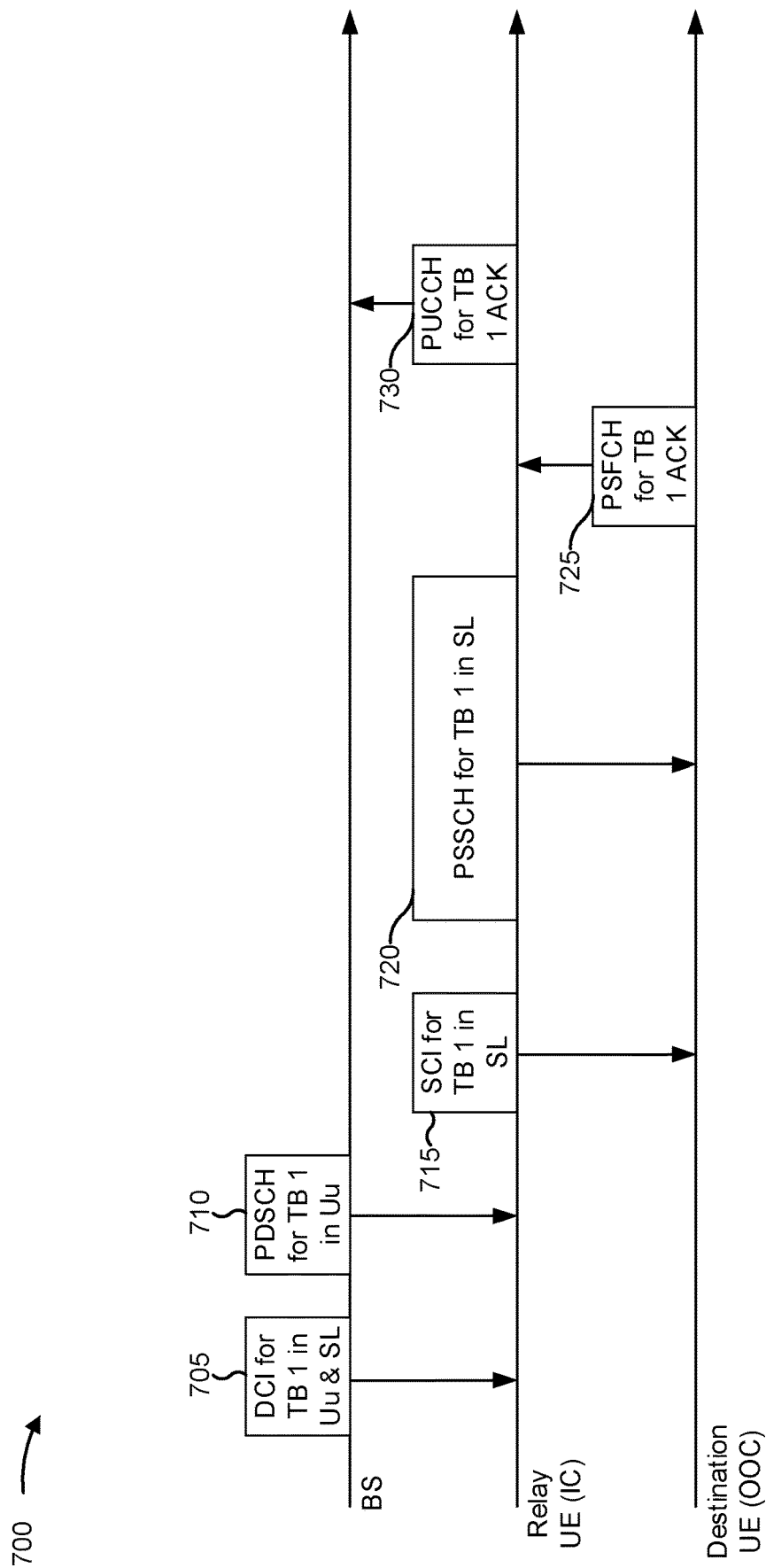
FIG. 7 is a diagram illustrating an example of sidelink relaying of a downlink communication using a single downlink control information (DCI) message, in accordance with the present disclosure

FIG. 7 is a diagram illustrating an example 700 of sidelink relaying of a downlink communication using a single DCI message, in accordance with the present disclosure. As shown, example 700 includes a BS (e.g., BS 110, BS 504, the source BS of example 600), a relay UE (e.g., UE 120, UE 305, UE 405, UE 410, UE 502, the relay UE of FIG. 6), and a destination UE (e.g., UE 120, UE 305, UE 405, UE 410, UE 502, the destination UE of example 600). In example 700, the BS is a source node, and the destination UE is a destination node. As further shown, the relay UE is in coverage of the BS, and the destination UE is out of coverage of the BS. The relay UE may have a radio access (e.g., Uu) link with the BS, and the relay UE may have a sidelink with the destination UE.

In example 700, the BS transmits a single DCI that (e.g., simultaneously) allocates a first grant on the radio access link and a second grant on the sidelink. For example, the first grant may be for a first transmission (e.g., hop) of the downlink communication (between the BS and the relay UE), and the second grant may be for a second transmission (e.g., hop) of the downlink communication (between the relay UE and the destination UE). For example, the BS may transmit DCI 705. The DCI 705 may be for a TB shown as TB 1. A TB is a set of data from a medium access control (MAC) layer of a source node. A TB may be mapped onto resources of a physical channel, such as a PDSCH, a PUSCH, or a PSSCH, and transmitted on a resource allocation identified by the DCI 705.

The DCI 705 may include a first set of parameters for the first transmission and a second set of parameters for the second transmission. A set of parameters, of the first set of parameters and the second set of parameters, may include one or more of a data resource allocation (e.g., a resource allocation for the scheduled transmission), an MCS, a DMRS parameter (such as a scrambling identifier, a configuration type, a position, a maximum length, an indicator of single symbol or double symbol), a precoder parameter (such as a DMRS type parameter, a maximum length parameter, or the like), a transmit precoding matrix indicator (TPMI), a beam indication (such as based at least in part on a transmission configuration indicator state or an uplink spatial configuration), a downlink assignment index (which may indicate an index of the DCI 705 relative to other DCI bunded in a same HARQ transmission), a HARQ process identifier (which may indicate a HARQ process associated with the DCI 705), a new data indicator (e.g., a value indicating whether the DCI 705 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more component carrier (CC) or bandwidth part (BWP) identifiers (e.g., indicating a CC or BWP on which the DCI 705 schedules a communication), an identifier of the source node, or an identifier of the destination node.

The DCI 705 may schedule a first transmission 710 from the BS to the relay UE. As shown, the first transmission 710 may carry the TB 1 on the Uu link. As shown, the relay UE may transmit SCI 715 for TB 1 to the destination UE. For example, the relay UE may generate and/or transmit the SCI 715 in accordance with the DCI 705 (e.g., using the second set of parameters). The SCI 715 may schedule (e.g., reserve) a resource on which the relay UE can transmit the TB 1 to the destination UE. As shown, the relay UE may transmit a PSSCH 720 to the destination UE on the sidelink. As further shown, the PSSCH 720 may carry the TB 1. As shown, the destination UE may transmit feedback 725 (e.g., via a PSFCH) regarding the second transmission to the relay UE. The feedback 725 may indicate whether the destination UE successfully received, or failed to receive, the second transmission. As further shown, the relay UE may transmit feedback 730 regarding at least one of the first transmission or the second transmission. For example, the relay UE may transmit a PUCCH carrying an acknowledgment for the TB 1. In some aspects, the relay UE may relay the feedback 725 to the BS. In some other aspects, the relay UE may transmit only the feedback 730 or only feedback regarding the first transmission.

In some aspects, reception of the first transmission from the BS may fail. For example, the relay UE may fail to decode the TB 1 via the first transmission. In some aspects, the relay UE may provide early feedback (not shown) regarding the first transmission if the first transmission fails. For example, the relay UE may transmit the feedback prior to transmitting the SCI 715 or the PSSCH 720 (e.g., without transmitting the SCI 715 or the PSSCH 720). In some aspects, the relay UE may transmit the feedback via a PUCCH, such as on a resource scheduled by the DCI 705.

As indicated above, FIG. 7 is provided as an example. Other examples may differ from what is described with regard to FIG. 7.

Figure 8:
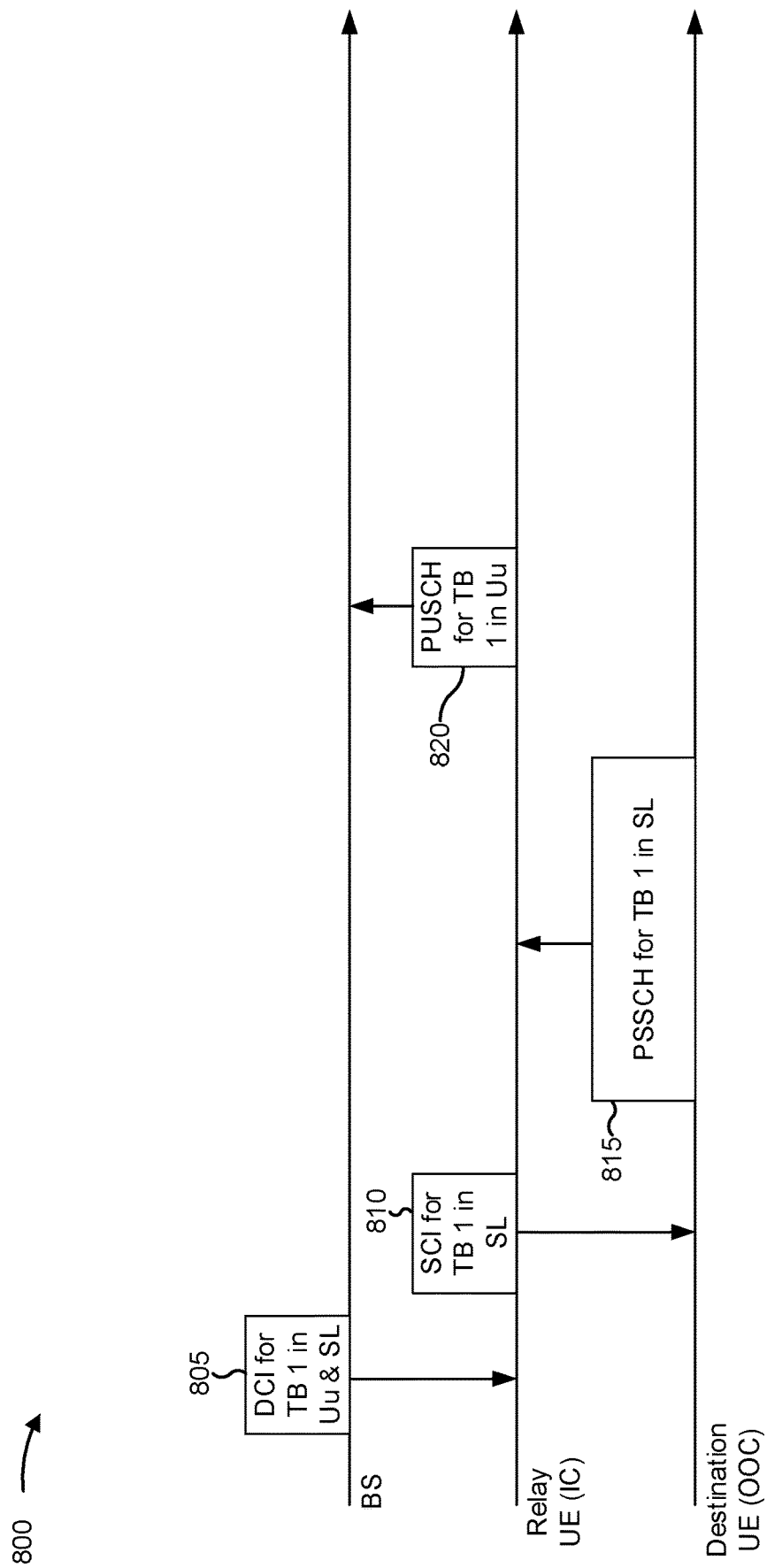
FIG. 8 is a diagram illustrating an example of sidelink relaying of an uplink communication using a single DCI message, in accordance with the present disclosure.

FIG. 8 is a diagram illustrating an example 800 of sidelink relaying of an uplink communication using a single DCI message, in accordance with the present disclosure. As shown, example 800 includes a BS (e.g., BS 110, BS 504, the source BS of example 600), a relay UE (e.g., UE 120, UE 305, UE 405, UE 410, UE 502, the relay UE of FIG. 6), and a source UE (e.g., UE 120, UE 305, UE 405, UE 410, UE 502, the source UE of example 600 or 605). In example 800, the BS is a destination node, and the source UE is a source node. As further shown, the relay UE is in coverage of the BS, and the source UE is out of coverage of the BS. The relay UE may have a radio access (e.g., Uu) link with the BS, and the relay UE may have a sidelink with the source UE.

In example 800, the BS transmits a single DCI that (e.g., simultaneously) allocates a first grant on the sidelink and a second grant on the radio access link. For example, the first grant may be for a first transmission (e.g., hop) of the uplink communication (between the source UE and the relay UE) and the second grant may be for a second transmission (e.g., hop) of the uplink communication (between the relay UE and the BS). For example, the BS may transmit DCI 805. The DCI 805 may be for a TB 1. The DCI 805 may include a first set of parameters for the first transmission and a second set of parameters for the second transmission. A set of parameters, of the first set of parameters and the second set of parameters, may include one or more of a data resource allocation (e.g., a resource allocation for the scheduled transmission), a modulation and coding scheme, a demodulation reference signal parameter (such as a scrambling identifier, a configuration type, a position, a maximum length, an indicator of single symbol or double symbol), a precoder parameter, a TPMI, a beam indication (such as based at least in part on a transmission configuration indicator state or an uplink spatial configuration), a downlink assignment index (which may indicate an index of the DCI 805 relative to other DCI bunded in a same HARQ transmission), a HARQ process identifier (which may indicate a HARQ process associated with the DCI 805), a new data indicator (e.g., a value indicating whether the DCI 805 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more CC or BWP identifiers (e.g., indicating a CC or BWP on which the DCI 805 schedules a communication), an identifier of the source node, or an identifier of the destination node.

The DCI 805 may schedule or facilitate scheduling of a first transmission 815 from the source UE to the relay UE and a second transmission 820 from the relay UE to the BS. As shown, the relay UE may transmit SCI 810 for TB 1 to the source UE. For example, the relay UE may generate and/or transmit the SCI 810 in accordance with the DCI 805 (e.g., using the first set of parameters). In some aspects, the DCI 805 may schedule the SCI 810. The SCI 810 may schedule (e.g., reserve) a resource on which the source UE can transmit the TB 1 to the relay UE. As shown, the source UE may transmit the first transmission 815 (e.g., the PSSCH) to the relay UE on the sidelink. As further shown, the first transmission 815 may carry the TB 1. As shown, the first transmission 815 may carry the TB 1 on the sidelink. As shown, the relay UE may transmit the second transmission 820 carrying the TB 1 on the radio access link (e.g., using the second set of parameters, on a grant scheduled by the DCI 805).

In some aspects, reception of the TB 1 from the destination UE may fail. For example, reception of at least one TB or code block group (CBG) of the first transmission may fail (referred to as a failure to receive the first transmission). In this case, the relay UE may provide information indicating one or more failed TB/CBGs to the BS for scheduling future retransmissions. For example, the failed TB/CBGs can be indicated by uplink control information or a MAC control element (MAC-CE). In some aspects, the information indicating the one or more failed TB/CBGs may be multiplexed on a PUSCH carrying one or more successful TB/CBGs (such as the PUSCH of the second transmission 820). In some aspects, the information indicating the one or more failed TB/CBGs may be transmitted in a dedicated PUCCH or PUSCH if there are no successful TB/CBG. For example, a resource allocation for the dedicated PUCCH or PUSCH can be scheduled by the DCI 805.

As indicated above, FIG. 8 is provided as an example. Other examples may differ from what is described with regard to FIG. 8.

Figure 9:
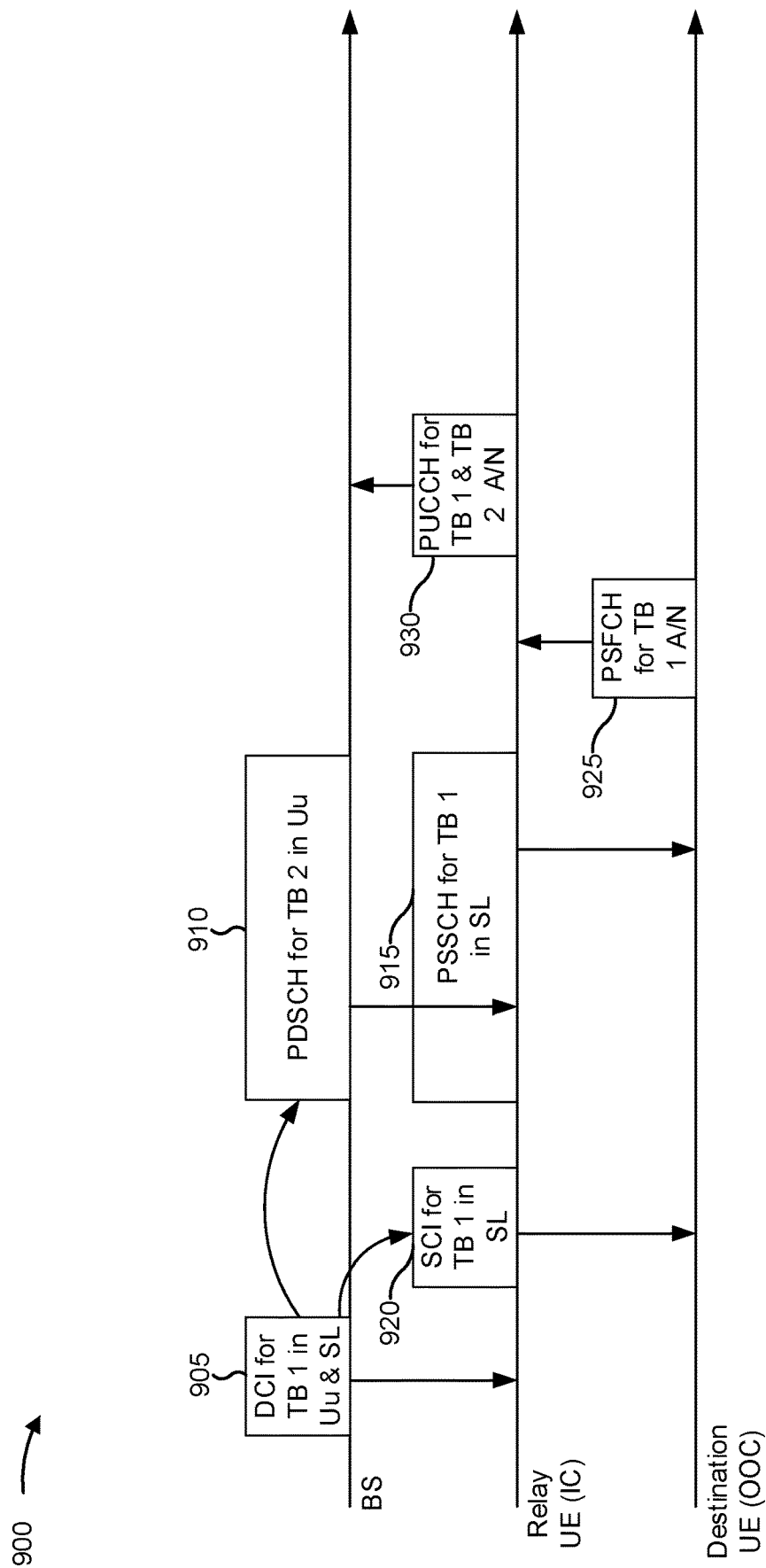
FIG. 9 is a diagram illustrating an example of sidelink relaying of a downlink communication and FD communication using a single DCI message, in accordance with the present disclosure.

FIG. 9 is a diagram illustrating an example 900 of sidelink relaying of a downlink communication and FD communication using a single DCI message, in accordance with the present disclosure. As shown, example 900 includes a BS (e.g., BS 110, BS 504, the source BS of example 600), a relay UE (e.g., UE 120, UE 305, UE 405, UE 410, UE 502, the relay UE of FIG. 6), and a destination UE (e.g., UE 120, UE 305, UE 405, UE 410, UE 502, the destination UE of example 600). In example 900, the BS is a source node, and the destination UE is a destination node. As further shown, the relay UE is in coverage of the BS, and the destination UE is out of coverage of the BS. The relay UE may have a radio access (e.g., Uu) link with the BS, and the relay UE may have a sidelink with the destination UE.

In example 900, the BS transmits a single DCI 905 that (e.g., simultaneously) allocates a first grant on the radio access link and a second grant on the sidelink. For example, the first grant may be for a first transmission 910 (e.g., hop) from the base station to the relay UE, and the second grant may be for a second transmission 915 (e.g., hop) of between the relay UE and the destination UE. The first transmission 910 and the second transmission 915 may be full-duplexed with each other (e.g., the relay UE may be in an FD mode for the first transmission 910 and the second transmission 915). The DCI 905 may be for a TB 2 (to be carried by the first transmission 910) and a TB 1 (to be carried by the second transmission 915). In example 900, the TB 1 has been previously received by the relay UE from the BS.

The DCI 905 may include a first set of parameters for the first transmission and a second set of parameters for the second transmission. A set of parameters, of the first set of parameters and the second set of parameters, may include one or more of a data resource allocation (e.g., a resource allocation for the scheduled transmission), a modulation and coding scheme, a demodulation reference signal parameter (such as a scrambling identifier, a configuration type, a position, a maximum length, an indicator of single symbol or double symbol), a precoder parameter, a TPMI, a beam indication (such as based at least in part on a transmission configuration indicator state or an uplink spatial configuration), a downlink assignment index (which may indicate an index of the DCI 905 relative to other DCI bunded in a same HARQ transmission), a HARQ process identifier (which may indicate a HARQ process associated with the DCI 905), a new data indicator (e.g., a value indicating whether the DCI 905 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more CC or BWP identifiers (e.g., indicating a CC or BWP on which the DCI 905 schedules a communication), an identifier of the source node, or an identifier of the destination node.

The DCI 905 may schedule or facilitate scheduling of a first transmission 910 from the BS to the relay UE and a simultaneous second transmission 915 from the relay UE to the destination UE. As shown, the relay UE may transmit SCI 920 for TB 1 to the destination UE. For example, the relay UE may generate and/or transmit the SCI 920 in accordance with the DCI 905 (e.g., using the second set of parameters). The SCI 920 may schedule (e.g., reserve) a resource on which the relay UE can transmit the TB 1 to the destination UE. As shown, the BS may transmit the first transmission 910 (e.g., via the PDSCH) to the relay UE on the radio access link (e.g., using the first set of parameters indicated by the DCI 905). As further shown, the first transmission 910 may carry the TB 2. As shown, the second transmission 915 may carry the TB 1 on the sidelink (e.g., via a PSSCH), and may be contemporaneous with the first transmission 910 (as indicated by the vertical overlap of the PDSCH and the PSSCH). For example, the relay UE may transmit the second transmission 915 using the second set of parameters and/or in accordance with the SCI 920.

As shown, the destination UE may transmit feedback 925 regarding the second transmission 915 (e.g., via a PSFCH) to the relay UE. As further shown, the relay UE may transmit feedback 930 regarding the first transmission 910 and/or the second transmission 915 (e.g., via a PUCCH) to the BS.

If the first transmission 910 and the second transmission 915 are both successful, then the BS may schedule a third transmission and a fourth transmission using a single DCI. For example, the third transmission may be of a third TB (e.g., TB 3) from the BS to the relay UE, and the fourth transmission may be of the TB 2 from the relay UE to the destination UE. In this case, the third transmission and the fourth transmission may be FD communications (e.g., the relay UE may be in an FD mode for the third transmission and the fourth transmission). If only one of the first transmission 910 and the second transmission 915 is successful, then the BS may schedule retransmission of the failed transmission, such as in an HD mode.

Thus, the single DCI 905 facilitates FD communication at the relay UE, such as for a sidelink relaying configuration as illustrated in FIG. 9.

As indicated above, FIG. 9 is provided as an example. Other examples may differ from what is described with regard to FIG. 9.

Figure 10:
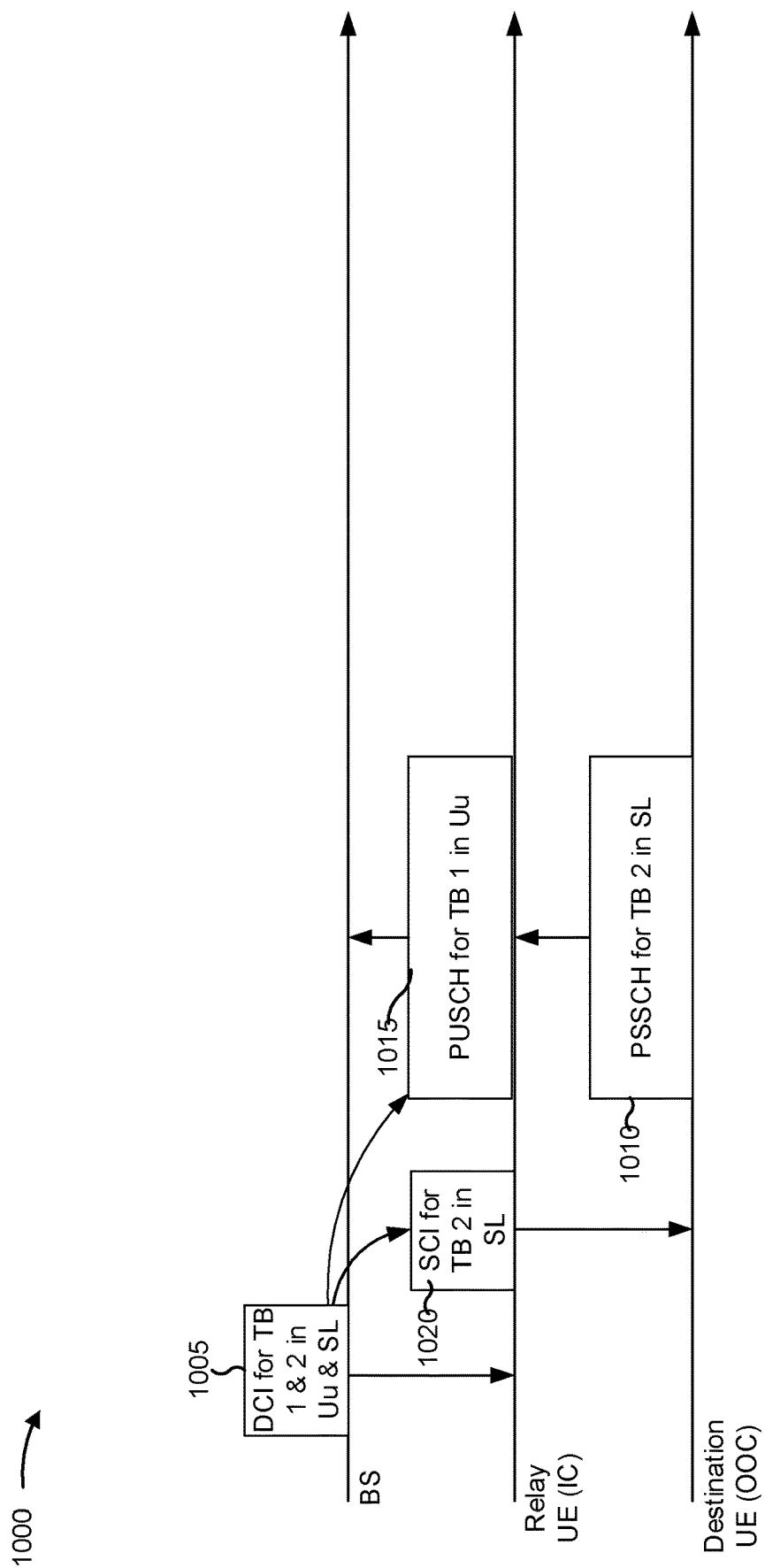
FIG. 10 is a diagram illustrating an example of FD communication using a single DCI message, in accordance with the present disclosure.

FIG. 10 is a diagram illustrating an example 1000 of FD communication using a single DCI message, in accordance with the present disclosure. As shown, example 1000 includes a BS (e.g., BS 110, BS 504, the source BS of example 600), a relay UE (e.g., UE 120, UE 305, UE 405, UE 410, UE 502, the relay UE of FIG. 6), and a source UE (e.g., UE 120, UE 305, UE 405, UE 410, UE 502, the source UE of example 600 or 605). In example 1000, the BS is a destination node, and the source UE is a source node. As further shown, the relay UE is in coverage of the BS, and the source UE is out of coverage of the BS. The relay UE may have a radio access (e.g., Uu) link with the BS, and the relay UE may have a sidelink with the source UE.

In example 1000, the BS transmits a single DCI 1005 that (e.g., simultaneously) allocates a first grant on the sidelink and a second grant on the radio access. For example, the first grant may be for a first transmission 1010 (e.g., hop) from the source UE to the relay UE, and the second grant may be for a second transmission 1015 (e.g., hop) between the relay UE and the BS. The first transmission 1010 and the second transmission 1015 may be full-duplexed with each other (e.g., the relay UE may be in an FD mode for the first transmission 1010 and the second transmission 1015). The DCI 905 may be for a TB 2 (to be carried by the first transmission 1010) and a TB 1 (to be carried by the second transmission 1015). In example 1000, the TB 1 has been previously received by the relay UE from the source UE.

The DCI 1005 may include a first set of parameters for the first transmission and a second set of parameters for the second transmission. A set of parameters, of the first set of parameters and the second set of parameters, may include one or more of a data resource allocation (e.g., a resource allocation for the scheduled transmission), a modulation and coding scheme, a demodulation reference signal parameter (such as a scrambling identifier, a configuration type, a position, a maximum length, an indicator of single symbol or double symbol), a precoder parameter, a TPMI, a beam indication (such as based at least in part on a transmission configuration indicator state or an uplink spatial configuration), a downlink assignment index (which may indicate an index of the DCI 1005 relative to other DCI bunded in a same HARQ transmission), a HARQ process identifier (which may indicate a HARQ process associated with the DCI 1005), a new data indicator (e.g., a value indicating whether the DCI 1005 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more CC or BWP identifiers (e.g., indicating a CC or BWP on which the DCI 1005 schedules a communication), an identifier of the source node, or an identifier of the destination node.

The DCI 1005 may schedule or facilitate scheduling of a first transmission 1010 from the source UE to the relay UE and a simultaneous second transmission 1015 from the relay UE to the BS. As shown, the relay UE may transmit SCI 1020 for TB 2 to the source UE. For example, the relay UE may generate and/or transmit the SCI 1020 in accordance with the DCI 1005 (e.g., using the first set of parameters). The SCI 1020 may schedule (e.g., reserve) a resource on which the source UE can transmit the TB 2 to the relay UE. As shown, the source UE may transmit the first transmission 1010 (e.g., via the PSSCH) to the relay UE on the sidelink (e.g., using the first set of parameters indicated by the DCI 1005). As further shown, the first transmission 1010 may carry the TB 2. As shown, the second transmission 1015 may carry the TB 1 on the radio access link (e.g., via a PUSCH), and may be contemporaneous with the first transmission 1010 (as indicated by the vertical overlap of the PUSCH and the PSSCH). For example, the relay UE may transmit the second transmission 1015 using the second set of parameters.

If the first transmission 1010 and the second transmission 1015 are both successful, then the BS may schedule a third transmission and a fourth transmission using a single DCI. For example, the third transmission may be of a third TB (e.g., TB 3) from the source UE to the relay UE, and the fourth transmission may be of the TB 2 from the relay UE to the BS. In this case, the third transmission and the fourth transmission may be FD communications (e.g., the relay UE may be in an FD mode for the third transmission and the fourth transmission). If only one of the first transmission 1010 and the second transmission 1015 is successful, then the BS may schedule retransmission of the failed transmission, such as in an HD mode.

Thus, the single DCI 1005 facilitates FD communication at the relay UE, such as for a sidelink relaying configuration as illustrated in FIG. 10.

As indicated above, FIG. 10 is provided as an example. Other examples may differ from what is described with regard to FIG. 10.

Figure 11:
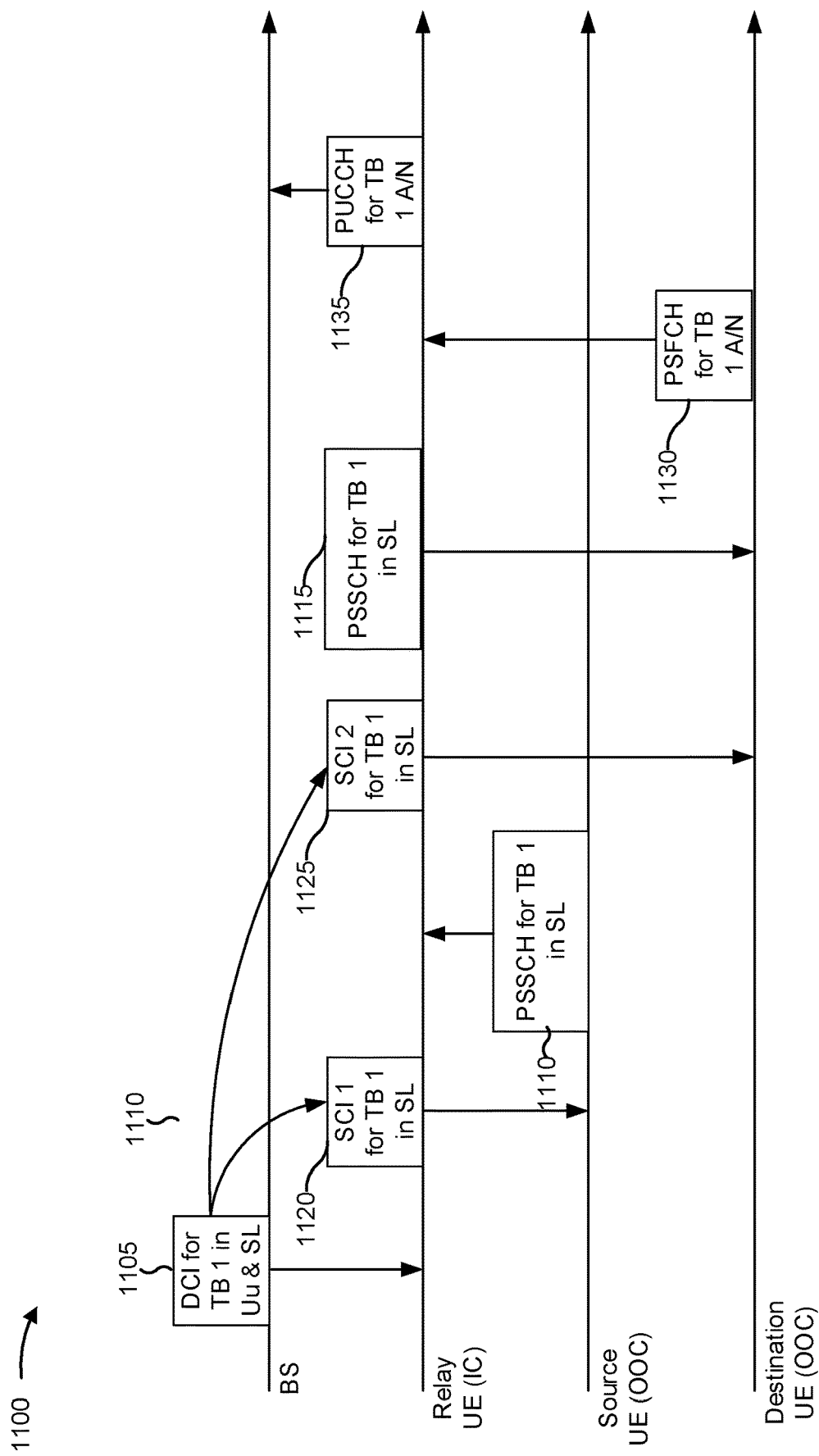
FIG. 11 is a diagram illustrating an example of sidelink relaying from a source UE to a destination UE using a single DCI message, in accordance with the present disclosure.

FIG. 11 is a diagram illustrating an example 1100 of sidelink relaying from a source UE to a destination UE using a single DCI message, in accordance with the present disclosure. As shown, example 1100 includes a BS (e.g., BS 110, BS 504, the BS of example 605), a relay UE (e.g., UE 120, UE 305, UE 405, UE 410, UE 502, the relay UE of FIG. 6), a destination UE (e.g., UE 120, UE 305, UE 405, UE 410, UE 502, the destination UE of example 605), and a source UE (e.g., UE 120, UE 305, UE 405, UE 410, UE 502, the source UE of example 605). In example 1100, the source UE is a source node, and the destination UE is a destination node. As further shown, the relay UE is in coverage of the BS, and the source UE and the destination UE are out of coverage of the BS. The relay UE may have a radio access (e.g., Uu) link with the BS, and the relay UE may have sidelinks with the destination UE and the source UE.

In example 1100, the BS transmits a single DCI that (e.g., simultaneously) allocates a first grant for a first transmission 1110 (e.g., hop) between the source UE and the relay UE) and a second grant for a second transmission 1115 (e.g., hop) between the relay UE and the destination UE. For example, the BS may transmit DCI 1105. The DCI 1105 may be for a TB 1. The DCI 1105 may include a first set of parameters for the first transmission 1110 and a second set of parameters for the second transmission 1115. A set of parameters, of the first set of parameters and the second set of parameters, may include one or more of a data resource allocation (e.g., a resource allocation for the scheduled transmission), a modulation and coding scheme, a demodulation reference signal parameter (such as a scrambling identifier, a configuration type, a position, a maximum length, an indicator of single symbol or double symbol), a precoder parameter, a TPMI, a beam indication (such as based at least in part on a transmission configuration indicator state or an uplink spatial configuration), a downlink assignment index (which may indicate an index of the DCI 1105 relative to other DCI bunded in a same HARQ transmission), a HARQ process identifier (which may indicate a HARQ process associated with the DCI 1105), a new data indicator (e.g., a value indicating whether the DCI 1105 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more CC or BWP identifiers (e.g., indicating a CC or BWP on which the DCI 1105 schedules a communication), an identifier of the source node, or an identifier of the destination node.

The DCI 1105 may schedule or facilitate scheduling of a first transmission 1110 from the source UE to the relay UE and a second transmission 1115 from the relay UE to the destination UE. As shown, the relay UE may transmit SCI 1120 for TB 1 to the source UE. For example, the relay UE may generate and/or transmit the SCI 1120 in accordance with the DCI 1105 (e.g., using the first set of parameters). In some aspects, the DCI 1105 may schedule the SCI 1120. The SCI 1120 may schedule (e.g., reserve) a resource on which the source UE can transmit the TB 1 to the relay UE. As shown, the source UE may transmit the first transmission 1110 (e.g., the PSSCH) to the relay UE on the sidelink. As further shown, the first transmission 1110 may carry the TB 1 on the sidelink.

As shown, the relay UE may transmit SCI 1125 for TB 1 to the destination UE. For example, the relay UE may generate and/or transmit the SCI 1125 in accordance with the DCI 1105 (e.g., using the second set of parameters). In some aspects, the DCI 1105 may schedule the SCI 1125. The SCI 1125 may schedule (e.g., reserve) a resource on which the relay UE can transmit the TB 1 to the destination UE. As shown, the relay UE may transmit the second transmission 1115 (e.g., the PSSCH) to the destination UE on the sidelink. As further shown, the second transmission 1115 may carry the TB 1 on the sidelink.

As shown, the destination UE may transmit feedback 1130 to the relay UE, such as via a PSFCH. The feedback 1130 may indicate whether the destination UE successfully decoded the second transmission 1115. As shown, the relay UE may transmit feedback 1135 to the BS, such as via a PUCCH. The feedback 1135 may indicate whether one or more of the first transmission 1110 or the second transmission 1115 were successfully received.

Thus, the single DCI 1105 facilitates sidelink relaying, such as for a sidelink relaying configuration as illustrated in FIG. 11.

As indicated above, FIG. 11 is provided as an example. Other examples may differ from what is described with regard to FIG. 11.

Figure 12:
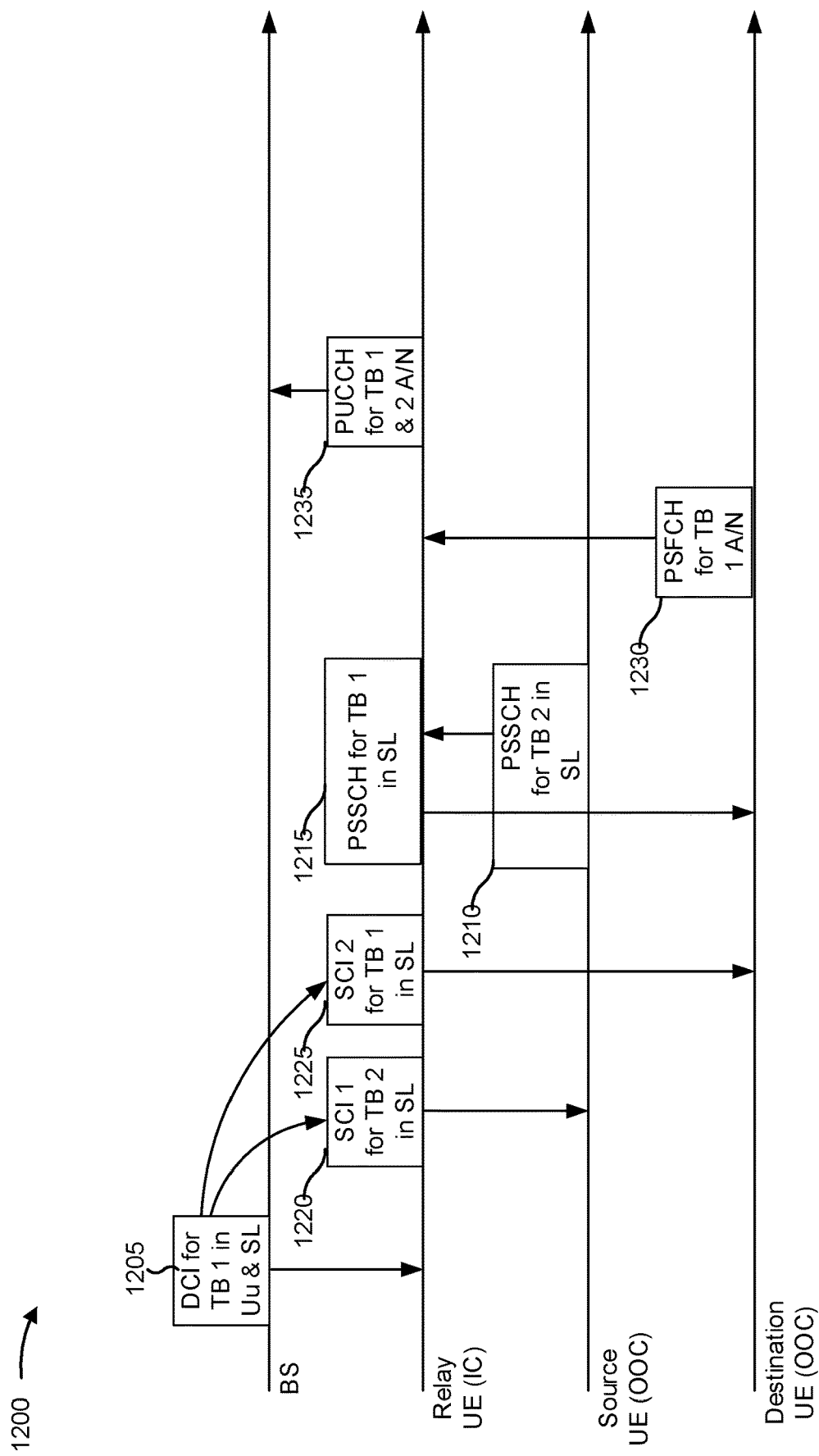
FIG. 12 is a diagram illustrating an example of FD communication between a source UE and a destination UE using a single DCI message, in accordance with the present disclosure.

FIG. 12 is a diagram illustrating an example 1200 of FD communication between a source UE and a destination UE using a single DCI message, in accordance with the present disclosure. As shown, example 1200 includes a BS (e.g., BS 110, BS 504, the BS of example 605), a relay UE (e.g., UE 120, UE 305, UE 405, UE 410, UE 502, the relay UE of FIG. 6), a destination UE (e.g., UE 120, UE 305, UE 405, UE 410, UE 502, the destination UE of example 605), and a source UE (e.g., UE 120, UE 305, UE 405, UE 410, UE 502, the source UE of example 605). As further shown, the relay UE is in coverage of the BS, and the source UE and the destination UE are out of coverage of the BS. The relay UE may have a radio access (e.g., Uu) link with the BS, and the relay UE may have sidelinks with the destination UE and the source UE.

In example 1200, the BS transmits a single DCI that (e.g., simultaneously) allocates a first grant for a first transmission 1210 (e.g., hop) between the source UE and the relay UE) and a second grant for a second transmission 1215 (e.g., hop) between the relay UE and the destination UE. For example, the BS may transmit DCI 1205. The DCI 1205 may be for a TB 1 and a TB 2. The TB 2 may be transmitted via the first transmission 1210 and the TB 1 may be transmitted via the second transmission 1215. For example, the relay UE may have previously received the TB 1 from the source UE, and the relay UE may be relaying the TB 1 to the destination UE.

The DCI 1205 may include a first set of parameters for the first transmission 1210 and a second set of parameters for the second transmission 1215. A set of parameters, of the first set of parameters and the second set of parameters, may include one or more of a data resource allocation (e.g., a resource allocation for the scheduled transmission), a modulation and coding scheme, a demodulation reference signal parameter (such as a scrambling identifier, a configuration type, a position, a maximum length, an indicator of single symbol or double symbol), a precoder parameter, a TPMI, a beam indication (such as based at least in part on a transmission configuration indicator state or an uplink spatial configuration), a downlink assignment index (which may indicate an index of the DCI 1205 relative to other DCI bunded in a same HARQ transmission), a HARQ process identifier (which may indicate a HARQ process associated with the DCI 1205), a new data indicator (e.g., a value indicating whether the DCI 1205 schedules an initial transmission or a retransmission), a redundancy version index (e.g., indicating where in a circular buffer mapping of the TB should begin), a feedback resource (e.g., indicating where HARQ feedback should be transmission), a first stage SCI format (e.g., indicating a format for SCI-1 to be transmitted by the relay UE), a second stage SCI format (e.g., indicating a format for SCI-2 to be transmitted by the relay UE), one or more CC or BWP identifiers (e.g., indicating a CC or BWP on which the DCI 1205 schedules a communication), an identifier of the source node, or an identifier of the destination node.

The DCI 1205 may schedule or facilitate scheduling of the first transmission 1210 from the source UE to the relay UE and the second transmission 1215 from the relay UE to the destination UE. For example, the first transmission 1210 and the second transmission 1215 may be full-duplexed with each other (e.g., the relay UE may be in an FD mode for the first transmission 1210 and the second transmission 1215). As shown, the relay UE may transmit SCI 1220 for TB 2 to the source UE. For example, the relay UE may generate and/or transmit the SCI 1220 in accordance with the DCI 1205 (e.g., using the first set of parameters). In some aspects, the DCI 1205 may schedule the SCI 1220. The SCI 1220 may schedule (e.g., reserve) a resource on which the source UE can transmit the TB 2 to the relay UE. As shown, the source UE may transmit the first transmission 1210 (e.g., the PSSCH) to the relay UE on the sidelink. As further shown, the first transmission 1210 may carry the TB 2 on the sidelink.

As shown, the relay UE may transmit SCI 1225 for TB 1 to the destination UE. For example, the relay UE may generate and/or transmit the SCI 1225 in accordance with the DCI 1205 (e.g., using the second set of parameters). In some aspects, the DCI 1205 may schedule the SCI 1225. The SCI 1225 may schedule (e.g., reserve) a resource on which the relay UE can transmit the TB 1 to the destination UE. As shown, the relay UE may transmit the second transmission 1215 (e.g., the PSSCH) to the destination UE on the sidelink. As further shown, the second transmission 1115 may carry the TB 1 on the sidelink.

As shown, the destination UE may transmit feedback 1230 to the relay UE, such as via a PSFCH. The feedback 1230 may indicate whether the destination UE successfully decoded the second transmission 1215. As shown, the relay UE may transmit feedback 1235 to the BS, such as via a PUCCH. The feedback 1235 may indicate whether one or more of the first transmission 1210 or the second transmission 1215 were successfully received.

In example 1200, a relayed communication between the source UE and the destination UE is not shown. The techniques of example 1200 can be applied to facilitate sidelink relaying in conjunction with FD communication. For example, the BS may transmit another DCI message for third SCI for a transmission of TB 2 from the relay UE to the destination UE and fourth SCI for a transmission of a TB 3 (in an FD mode with the transmission of TB 2) from the source UE to the relay UE.

Thus, the single DCI 1205 facilitates sidelink relaying using an FD mode at the relay UE, such as for a sidelink relaying configuration as illustrated in FIG. 12.

As indicated above, FIG. 12 is provided as an example. Other examples may differ from what is described with regard to FIG. 12.

Figure 13:
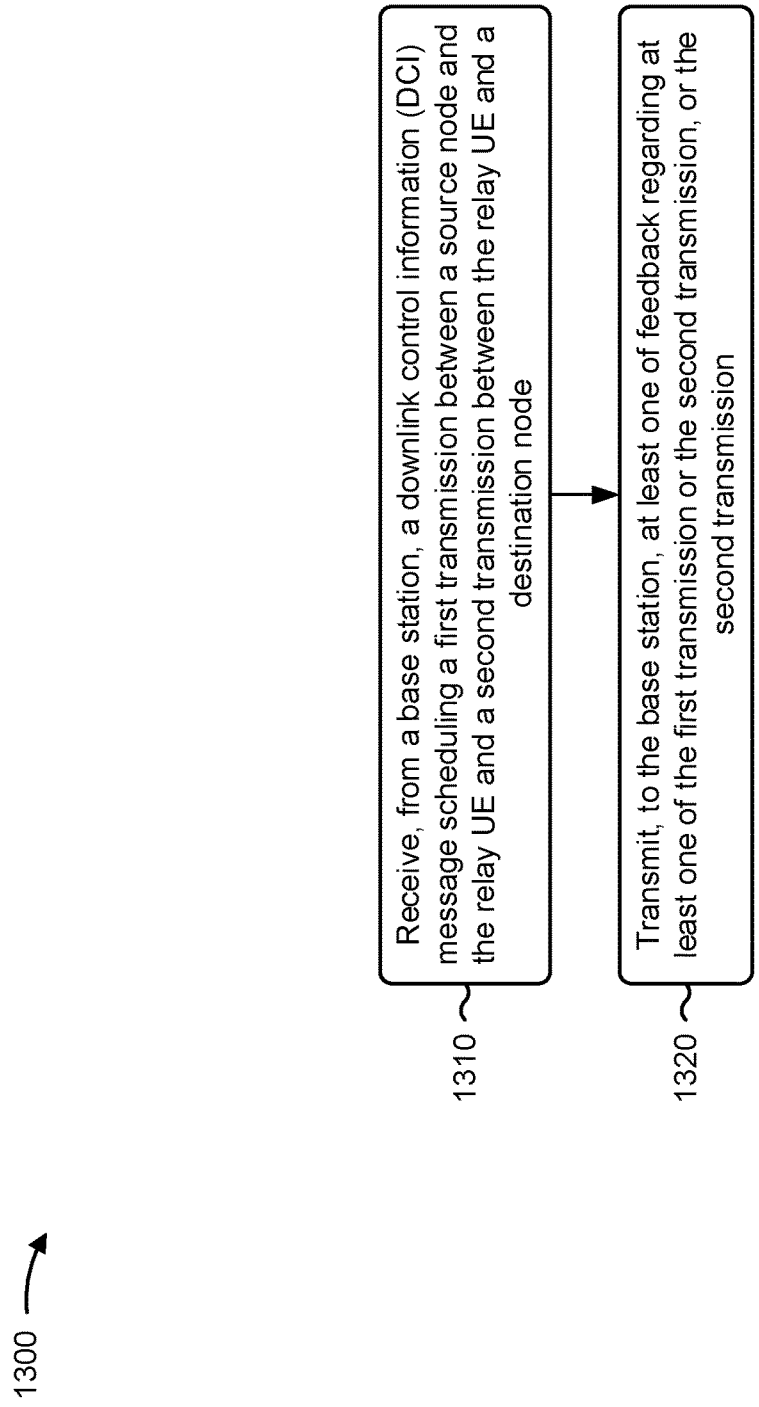
FIG. 13 is a diagram illustrating an example process performed, for example, by a relay UE, in accordance with the present disclosure.

FIG. 13 is a diagram illustrating an example process 1300 performed, for example, by a relay UE, in accordance with the present disclosure. Example process 1300 is an example where the relay UE (e.g., UE 120, UE 305, UE 405, UE 410, UE 502, the relay UE of FIGS. 6-12) performs operations associated with joint sidelink relay scheduling.

As shown in FIG. 13, in some aspects, process 1300 may include receiving, from a base station, a DCI message scheduling a first transmission between a source node and the relay UE and a second transmission between the relay UE and a destination node (block 1310). For example, the relay UE (e.g., using communication manager 140 and/or reception component 1502, depicted in FIG. 15) may receive, from a base station, a DCI message scheduling a first transmission between a source node and the relay UE and a second transmission between the relay UE and a destination node, as described above. The DCI message may include, for example, DCI 705/805/905/1005/1105/1205.

As further shown in FIG. 13, in some aspects, process 1300 may include transmitting, to the base station, at least one of: feedback regarding at least one of the first transmission or the second transmission, or the second transmission (block 1320). For example, the relay UE (e.g., using communication manager 140 and/or transmission component 1504, depicted in FIG. 15) may transmit, to the base station, at least one of: feedback regarding at least one of the first transmission or the second transmission, or the second transmission, as described above.

Process 1300 may include additional aspects, such as any single aspect or any combination of aspects described below and/or in connection with one or more other processes described elsewhere herein.

In a first aspect, the DCI message includes a first set of parameters for the first transmission and a second set of parameters for the second transmission.

In a second aspect, alone or in combination with the first aspect, the first set of parameters and the second set of parameters each indicate at least one of a data resource allocation, a modulation and coding scheme, a demodulation reference signal parameter, a precoder parameter, a transmit precoding matrix index, a beam indication, a downlink assignment index, a hybrid automatic repeat request process identifier, a new data indicator, a redundancy version index, a feedback resource, a first stage sidelink control information format, a second stage sidelink control information format, one or more component carrier or bandwidth part identifiers, an identifier of the source node, or an identifier of the destination node.

In a third aspect, alone or in combination with one or more of the first and second aspects, the base station is the source node, wherein the first transmission is received on a radio access link between the base station and the relay UE, and wherein the DCI message indicates a sidelink control information format for the second transmission between the relay UE and the destination node.

In a fourth aspect, alone or in combination with one or more of the first through third aspects, the base station is the source node, wherein the feedback is early feedback regarding a failure to receive the first transmission, and wherein the DCI message indicates an uplink control channel resource for the early feedback.

In a fifth aspect, alone or in combination with one or more of the first through fourth aspects, the base station is the destination node, wherein the DCI message indicates a sidelink control information format for the relay UE to schedule the second transmission, wherein the method further comprises transmitting sidelink control information using the sidelink control information format, and transmitting the second transmission via a radio access link between the base station and the relay UE.

In a sixth aspect, alone or in combination with one or more of the first through fifth aspects, the feedback indicates one or more failed TBs or CBGs that the relay UE failed to receive in the first transmission.

In a seventh aspect, alone or in combination with one or more of the first through sixth aspects, the feedback indicating the one or more failed TBs or CBGs is multiplexed with information regarding one or more successful TBs or CBGs that the relay UE received in the first transmission.

In an eighth aspect, alone or in combination with one or more of the first through seventh aspects, transmitting the feedback further comprises transmitting the feedback indicating the one or more failed TBs or CBGs in a dedicated transmission based at least in part on there being no successfully received TBs or CBGs in the first transmission.

In a ninth aspect, alone or in combination with one or more of the first through eighth aspects, a resource for the dedicated transmission is scheduled by the DCI message.

In a tenth aspect, alone or in combination with one or more of the first through ninth aspects, the first transmission and the second transmission are in an FD mode for the relay UE.

In an eleventh aspect, alone or in combination with one or more of the first through tenth aspects, the first transmission is via a first communication link and the second transmission is via a second communication link.

In a twelfth aspect, alone or in combination with one or more of the first through eleventh aspects, the second transmission carries a transport block previously received from the source node.

In a thirteenth aspect, alone or in combination with one or more of the first through twelfth aspects, the feedback indicates that the first transmission and the second transmission are successful, wherein the DCI message is a first DCI message, wherein the base station is the source node, and wherein the method further comprises receiving a second DCI message scheduling a third transmission between the base station and the relay UE and a fourth transmission between the relay UE and the destination node, wherein the fourth transmission carries a transport block from the first transmission, receiving the third transmission, and transmitting the fourth transmission.

In a fourteenth aspect, alone or in combination with one or more of the first through thirteenth aspects, the feedback indicates that only one of the first transmission and the second transmission is successful, wherein the DCI message is a first DCI message, and wherein the method further comprises receiving a second DCI message scheduling a retransmission of a failed transmission, of the first transmission and the second transmission, in a non-FD mode for the relay UE, and transmitting or scheduling the retransmission.

In a fifteenth aspect, alone or in combination with one or more of the first through fourteenth aspects, the feedback indicates that the first transmission and the second transmission are successful, wherein the DCI message is a first DCI message, wherein the base station is the destination node, and wherein the method further comprises receiving a second DCI message scheduling a third transmission between the source node and the relay UE and a fourth transmission between the relay UE and the base station, wherein the fourth transmission carries a transport block from the first transmission, receiving the third transmission, and transmitting or scheduling the fourth transmission.

In a sixteenth aspect, alone or in combination with one or more of the first through fifteenth aspects, the source node is a source UE, and the destination node is a destination UE.

In a seventeenth aspect, alone or in combination with one or more of the first through sixteenth aspects, the DCI message schedules transmission of first sidelink control information to schedule the first transmission between the source UE and the relay UE, and transmission of second sidelink control information to schedule the second transmission between the relay UE and the destination UE after the first transmission, wherein the method further comprises transmitting the first sidelink control information and the second sidelink control information.

In an eighteenth aspect, alone or in combination with one or more of the first through seventeenth aspects, the DCI message schedules transmission of first sidelink control information to schedule the first transmission between the source UE and the relay UE, and transmission of second sidelink control information to schedule the second transmission between the relay UE and the destination UE, wherein the first transmission and the second transmission are in a full-duplex mode at the relay UE, wherein the method further comprises transmitting the first sidelink control information and the second sidelink control information.

In a nineteenth aspect, alone or in combination with one or more of the first through eighteenth aspects, the second transmission carries a transport block previously received from the source UE.

In a twentieth aspect, alone or in combination with one or more of the first through nineteenth aspects, process 1300 includes receiving the first transmission, and transmitting the second transmission.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
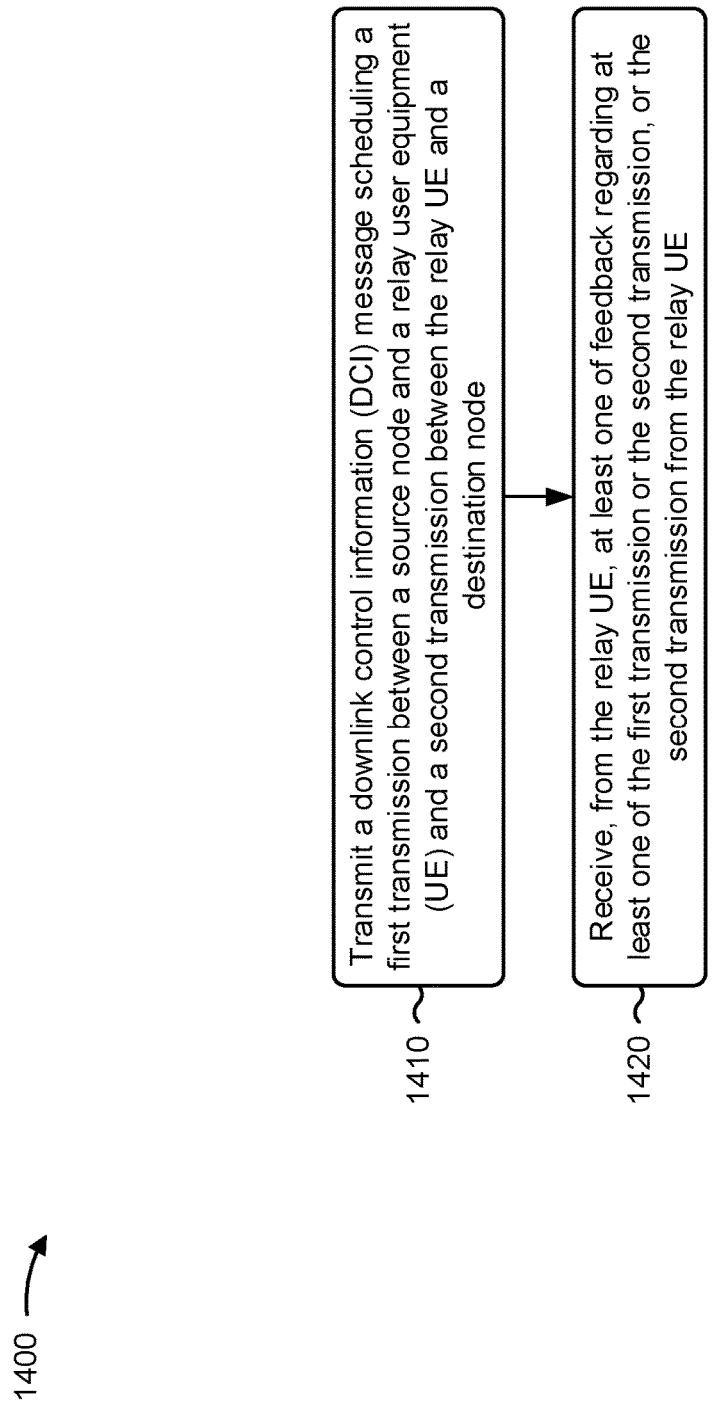
FIG. 14 is a diagram illustrating an example process performed, for example, by a base station, in accordance with the present disclosure.

FIG. 14 is a diagram illustrating an example process 1400 performed, for example, by a base station, in accordance with the present disclosure. Example process 1400 is an example where the base station (e.g., BS 110, BS 504, the BS of FIGS. 6-12) performs operations associated with joint sidelink relay scheduling.

As shown in FIG. 14, in some aspects, process 1400 may include transmitting a DCI message scheduling a first transmission between a source node and a relay UE and a second transmission between the relay UE and a destination node (block 1410). For example, the base station (e.g., using communication manager 150 and/or transmission component 1604, depicted in FIG. 16) may transmit a DCI message scheduling a first transmission between a source node and a relay UE and a second transmission between the relay UE and a destination node, as described above. The DCI message may include, for example, DCI 705/805/905/1005/ 1105/1205.

As further shown in FIG. 14, in some aspects, process 1400 may include receiving, from the relay UE, at least one of: feedback regarding at least one of the first transmission or the second transmission, or the second transmission from the relay UE (block 1420). For example, the base station (e.g., using communication manager 150 and/or reception component 1602, depicted in FIG. 16) may receive, from the relay UE, at least one of: feedback regarding at least one of the first transmission or the second transmission, or the second transmission from the relay UE, as described above.

Process 1400 may include additional aspects, such as any single aspect or any combination of aspects described below and/or in connection with one or more other processes described elsewhere herein.

In a first aspect, the DCI message includes a first set of parameters for the first transmission and a second set of parameters for the second transmission.

In a second aspect, alone or in combination with the first aspect, the first set of parameters and the second set of parameters each indicate at least one of a data resource allocation, a modulation and coding scheme, a demodulation reference signal parameter, a precoder parameter, a transmit precoding matrix index, a beam indication, a downlink assignment index, a hybrid automatic repeat request process identifier, a new data indicator, a redundancy version index, a feedback resource, a first stage sidelink control information format, a second stage sidelink control information format, one or more component carrier or bandwidth part identifiers, an identifier of the source node, or an identifier of the destination node.

In a third aspect, alone or in combination with one or more of the first and second aspects, the base station is the source node, wherein the first transmission is on a radio access link between the base station and the relay UE, and wherein the DCI message indicates a sidelink control information format for the second transmission between the relay UE and the destination node.

In a fourth aspect, alone or in combination with one or more of the first through third aspects, the base station is the source node, wherein the feedback is early feedback regarding a failure to receive the first transmission, and wherein the DCI message indicates an uplink control channel resource for the early feedback.

In a fifth aspect, alone or in combination with one or more of the first through fourth aspects, the base station is the destination node, wherein the DCI message indicates a sidelink control information format for the relay UE to schedule the second transmission, and wherein the second transmission is received via a radio access link between the base station and the relay UE.

In a sixth aspect, alone or in combination with one or more of the first through fifth aspects, the feedback indicates one or more failed TBs or CBGs that the relay UE failed to receive in the first transmission.

In a seventh aspect, alone or in combination with one or more of the first through sixth aspects, the feedback indicating the one or more failed TBs or CBGs is multiplexed with information regarding one or more successful TBs or CBGs that the relay UE received in the first transmission.

In an eighth aspect, alone or in combination with one or more of the first through seventh aspects, the feedback indicating the one or more failed TBs or CBGs is received in a dedicated transmission based at least in part on there being no successfully received TBs or CBGs in the first transmission.

In a ninth aspect, alone or in combination with one or more of the first through eighth aspects, a resource for the dedicated transmission is scheduled by the DCI message.

In a tenth aspect, alone or in combination with one or more of the first through ninth aspects, the first transmission and the second transmission are in a FD mode for the relay UE.

In an eleventh aspect, alone or in combination with one or more of the first through tenth aspects, the first transmission is via a first communication link and the second transmission is via a second communication link.

In a twelfth aspect, alone or in combination with one or more of the first through eleventh aspects, the second transmission carries a transport block previously received from the source node.

In a thirteenth aspect, alone or in combination with one or more of the first through twelfth aspects, the feedback indicates that only one of the first transmission and the second transmission is successful, wherein the DCI message is a first DCI message, and wherein the method further comprises transmitting a second DCI message scheduling a retransmission of a failed transmission, of the first transmission and the second transmission, in a non-FD mode for the relay UE.

In a fourteenth aspect, alone or in combination with one or more of the first through thirteenth aspects, the feedback indicates that the first transmission and the second transmission are successful, wherein the DCI message is a first DCI message, wherein the base station is the destination node, and wherein the method further comprises transmitting second DCI scheduling a third transmission between the source node and the relay UE and a fourth transmission between the relay UE and the base station, wherein the fourth transmission carries a transport block from the first transmission.

In a fifteenth aspect, alone or in combination with one or more of the first through fourteenth aspects, the feedback indicates that the first transmission and the second transmission are successful, wherein the DCI message is a first DCI message, wherein the base station is the source node, and wherein the method further comprises transmitting a second DCI message scheduling a third transmission between the base station and the relay UE and a fourth transmission between the relay UE and the destination node, wherein the fourth transmission carries a transport block from the first transmission.

In a sixteenth aspect, alone or in combination with one or more of the first through fifteenth aspects, the source node is a source UE and the destination node is a destination UE.

In a seventeenth aspect, alone or in combination with one or more of the first through sixteenth aspects, the DCI message schedules transmission of first sidelink control information to schedule the first transmission between the source UE and the relay UE, and transmission of second sidelink control information to schedule the second transmission between the relay UE and the destination UE after the first transmission.

In an eighteenth aspect, alone or in combination with one or more of the first through seventeenth aspects, the DCI message schedules transmission of first sidelink control information to schedule the first transmission between the source UE and the relay UE, and transmission of second sidelink control information to schedule the second transmission between the relay UE and the destination UE, wherein the first transmission and the second transmission are in a full-duplex mode at the relay UE.

In a nineteenth aspect, alone or in combination with one or more of the first through eighteenth aspects, the second transmission carries a transport block previously received from the source UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
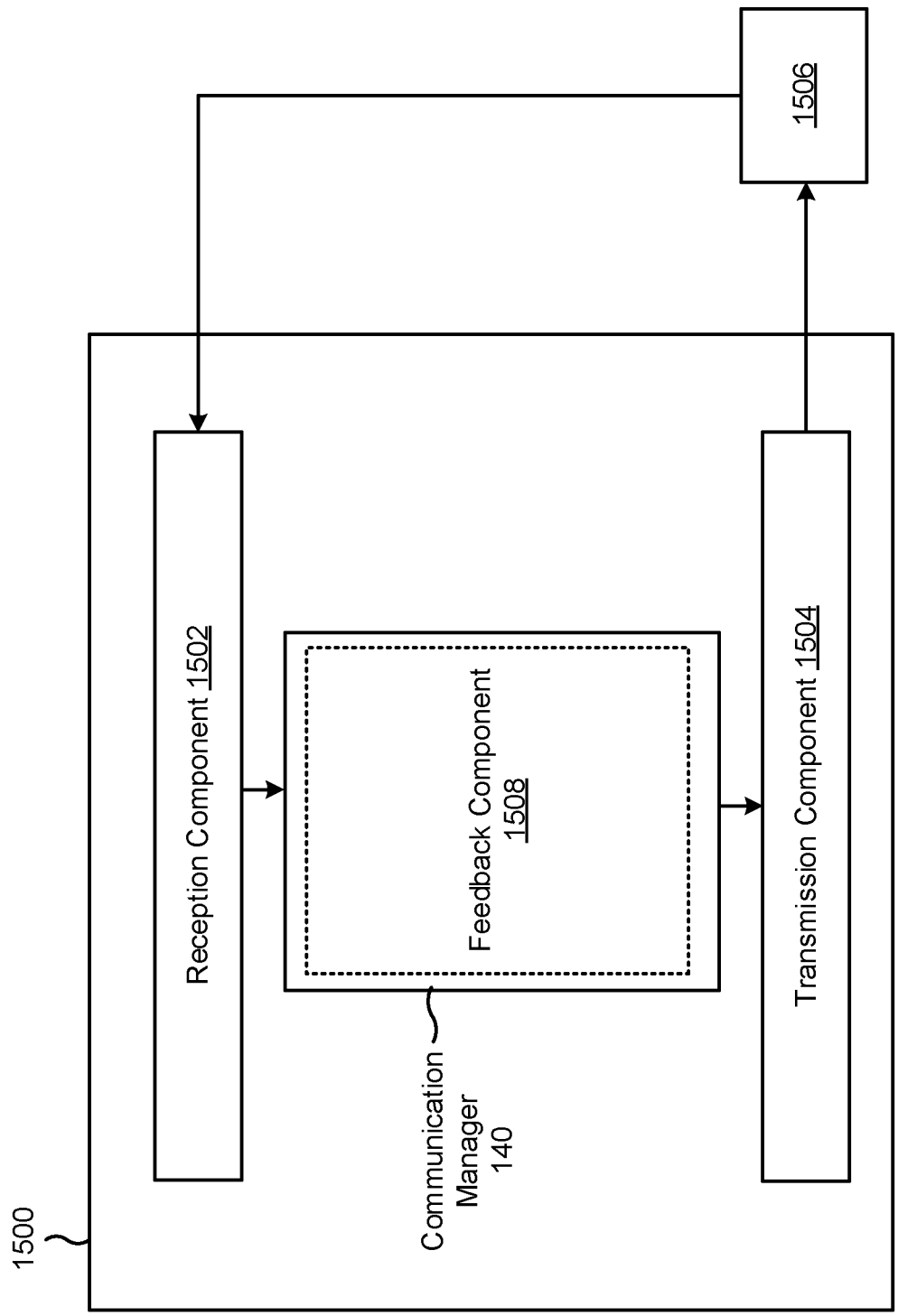
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE (e.g., UE 120, UE 305, UE 405, UE 410, UE 502, the relay UE of FIGS. 6-12), or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a feedback component 1508, among other examples.

In some aspects, the apparatus 1500 may be configured to perform one or more operations described herein in connection with FIGS. 3-12. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The below paragraphs are for the method claim set starting with claim 1.

The reception component 1502 may receive, from a base station, a DCI message scheduling a first transmission between a source node and the relay UE and a second transmission between the relay UE and a destination node. The transmission component 1504 or the feedback component 1508 may transmit, to the base station, at least one of feedback regarding at least one of the first transmission or the second transmission, or the second transmission.

The reception component 1502 may receive the first transmission.

The transmission component 1504 may transmit the second transmission.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
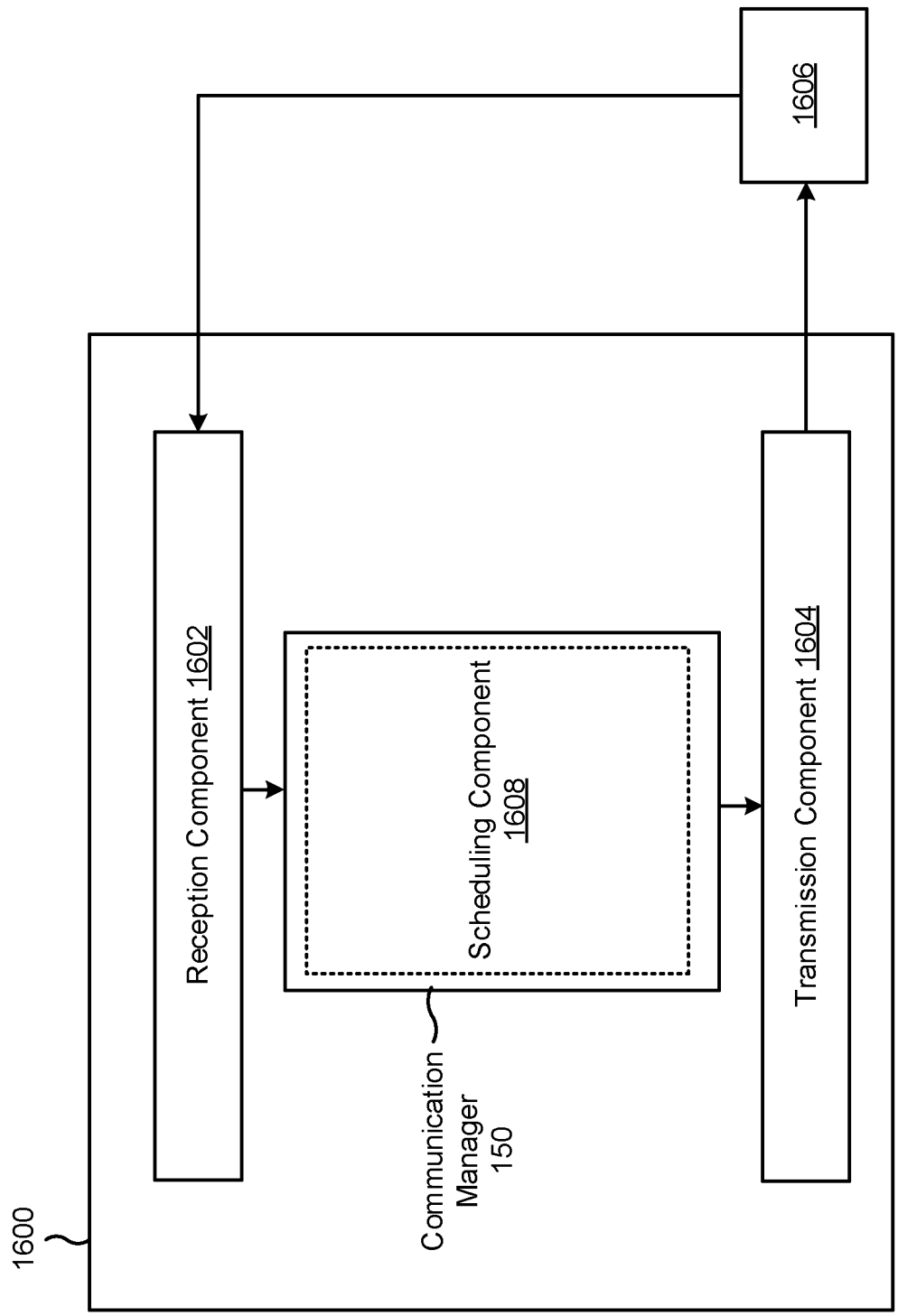
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a base station (e.g., BS 110, BS 504, the BS of FIGS. 6-12), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a scheduling component 1608, among other examples.

In some aspects, the apparatus 1600 may be configured to perform one or more operations described herein in connection with FIGS. 3-12. Additionally, or alternatively, the apparatus 1600 may be configured to perform one or more processes described herein, such as process 1400 of FIG. 14, or a combination thereof. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

The transmission component 1604 or the scheduling component 1608 may transmit a DCI message scheduling a first transmission between a source node and a relay UE and a second transmission between the relay UE and a destination node. The reception component 1602 may receive, from the relay UE, at least one of feedback regarding at least one of the first transmission or the second transmission, or the second transmission from the relay UE.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a relay user equipment (UE), comprising: receiving, from a base station, a downlink control information (DCI) message scheduling a first transmission between a source node and the relay UE and a second transmission between the relay UE and a destination node; and transmitting, to the base station, at least one of: feedback regarding at least one of the first transmission or the second transmission, or the second transmission.

Aspect 2: The method of Aspect 1, wherein the DCI message includes a first set of parameters for the first transmission and a second set of parameters for the second transmission.

Aspect 3: The method of Aspect 2, wherein the first set of parameters and the second set of parameters each indicate at least one of: a data resource allocation, a modulation and coding scheme, a demodulation reference signal parameter, a precoder parameter, a transmit precoding matrix index, a beam indication, a downlink assignment index, a hybrid automatic repeat request process identifier, a new data indicator, a redundancy version index, a feedback resource, a first stage sidelink control information format, a second stage sidelink control information format, one or more component carrier or bandwidth part identifiers, an identifier of the source node, or an identifier of the destination node.

Aspect 4: The method of any of Aspects 1-3, wherein the base station is the source node, wherein the first transmission is received on a radio access link between the base station and the relay UE, and wherein the DCI message indicates a sidelink control information format for the second transmission between the relay UE and the destination node.

Aspect 5: The method of any of Aspects 1-4, wherein the base station is the source node, wherein the feedback is early feedback regarding a failure to receive the first transmission, and wherein the DCI message indicates an uplink control channel resource for the early feedback.

Aspect 6: The method of any of Aspects 1-5, wherein the base station is the destination node, wherein the DCI message indicates a sidelink control information format for the relay UE to schedule the second transmission, wherein the method further comprises: transmitting sidelink control information using the sidelink control information format; and transmitting the second transmission via a radio access link between the base station and the relay UE.

Aspect 7: The method of Aspect 6, wherein the feedback indicates one or more failed transport blocks (TBs) or codeblock groups (CBGs) that the relay UE failed to receive in the first transmission.

Aspect 8: The method of Aspect 7, wherein the feedback indicating the one or more failed TBs or CBGs is multiplexed with information regarding one or more successful TBs or CBGs that the relay UE received in the first transmission.

Aspect 9: The method of Aspect 7, wherein transmitting the feedback further comprises: transmitting the feedback indicating the one or more failed TBs or CBGs in a dedicated transmission based at least in part on there being no successfully received TBs or CBGs in the first transmission.

Aspect 10: The method of Aspect 9, wherein a resource for the dedicated transmission is scheduled by the DCI message.

Aspect 11: The method of any of Aspects 1-10, wherein the first transmission and the second transmission are in a full-duplex (FD) mode for the relay UE.

Aspect 12: The method of Aspect 11, wherein the first transmission is via a first communication link and the second transmission is via a second communication link.

Aspect 13: The method of Aspect 11, wherein the second transmission carries a transport block previously received from the source node.

Aspect 14: The method of Aspect 11, wherein the feedback indicates that the first transmission and the second transmission are successful, wherein the DCI message is a first DCI message, wherein the base station is the source node, and wherein the method further comprises: receiving a second DCI message scheduling a third transmission between the base station and the relay UE and a fourth transmission between the relay UE and the destination node, wherein the fourth transmission carries a transport block from the first transmission; receiving the third transmission; and transmitting the fourth transmission.

Aspect 15: The method of Aspect 11, wherein the feedback indicates that only one of the first transmission and the second transmission is successful, wherein the DCI message is a first DCI message, and wherein the method further comprises: receiving a second DCI message scheduling a retransmission of a failed transmission, of the first transmission and the second transmission, in a non-FD mode for the relay UE; and transmitting or scheduling the retransmission.

Aspect 16: The method of Aspect 11, wherein the feedback indicates that the first transmission and the second transmission are successful, wherein the DCI message is a first DCI message, wherein the base station is the destination node, and wherein the method further comprises: receiving a second DCI message scheduling a third transmission between the source node and the relay UE and a fourth transmission between the relay UE and the base station, wherein the fourth transmission carries a transport block from the first transmission; receiving the third transmission; and transmitting or scheduling the fourth transmission.

Aspect 17: The method of any of Aspects 1-16, wherein the source node is a source UE and the destination node is a destination UE.

Aspect 18: The method of Aspect 17, wherein the DCI message schedules transmission of first sidelink control information to schedule the first transmission between the source UE and the relay UE, and transmission of second sidelink control information to schedule the second transmission between the relay UE and the destination UE after the first transmission, wherein the method further comprises: transmitting the first sidelink control information and the second sidelink control information.

Aspect 19: The method of Aspect 17, wherein the DCI message schedules transmission of first sidelink control information to schedule the first transmission between the source UE and the relay UE, and transmission of second sidelink control information to schedule the second transmission between the relay UE and the destination UE, wherein the first transmission and the second transmission are in a full-duplex mode at the relay UE, wherein the method further comprises: transmitting the first sidelink control information and the second sidelink control information.

Aspect 20: The method of Aspect 19, wherein the second transmission carries a transport block previously received from the source UE.

Aspect 21: The method of any of Aspects 1-20, further comprising: receiving the first transmission; and transmitting the second transmission.

Aspect 22: A method of wireless communication performed by a base station, comprising: transmitting a downlink control information (DCI) message scheduling a first transmission between a source node and a relay user equipment (UE) and a second transmission between the relay UE and a destination node; and receiving, from the relay UE, at least one of: feedback regarding at least one of the first transmission or the second transmission, or the second transmission from the relay UE.

Aspect 23: The method of Aspect 22, wherein the DCI message includes a first set of parameters for the first transmission and a second set of parameters for the second transmission.

Aspect 24: The method of Aspect 23, wherein the first set of parameters and the second set of parameters each indicate at least one of: a data resource allocation, a modulation and coding scheme, a demodulation reference signal parameter, a precoder parameter, a transmit precoding matrix index, a beam indication, a downlink assignment index, a hybrid automatic repeat request process identifier, a new data indicator, a redundancy version index, a feedback resource, a first stage sidelink control information format, a second stage sidelink control information format, one or more component carrier or bandwidth part identifiers, an identifier of the source node, or an identifier of the destination node.

Aspect 25: The method of any of Aspects 22-24, wherein the base station is the source node, wherein the first transmission is on a radio access link between the base station and the relay UE, and wherein the DCI message indicates a sidelink control information format for the second transmission between the relay UE and the destination node.

Aspect 26: The method of any of Aspects 22-25, wherein the base station is the source node, wherein the feedback is early feedback regarding a failure to receive the first transmission, and wherein the DCI message indicates an uplink control channel resource for the early feedback.

Aspect 27: The method of any of Aspects 22-26, wherein the base station is the destination node, wherein the DCI message indicates a sidelink control information format for the relay UE to schedule the second transmission, and wherein the second transmission is received via a radio access link between the base station and the relay UE.

Aspect 28: The method of Aspect 27, wherein the feedback indicates one or more failed transport blocks (TBs) or codeblock groups (CBGs) that the relay UE failed to receive in the first transmission.

Aspect 29: The method of Aspect 28, wherein the feedback indicating the one or more failed TBs or CBGs is multiplexed with information regarding one or more successful TBs or CBGs that the relay UE received in the first transmission.

Aspect 30: The method of Aspect 28, wherein the feedback indicating the one or more failed TBs or CBGs is received in a dedicated transmission based at least in part on there being no successfully received TBs or CBGs in the first transmission.

Aspect 31: The method of Aspect 30, wherein a resource for the dedicated transmission is scheduled by the DCI message.

Aspect 32: The method of any of Aspects 22-31, wherein the first transmission and the second transmission are in a full-duplex (FD) mode for the relay UE.

Aspect 33: The method of Aspect 32, wherein the first transmission is via a first communication link and the second transmission is via a second communication link.

Aspect 34: The method of Aspect 32, wherein the second transmission carries a transport block previously received from the source node.

Aspect 35: The method of Aspect 32, wherein the feedback indicates that only one of the first transmission and the second transmission is successful, wherein the DCI message is a first DCI message, and wherein the method further comprises: transmitting a second DCI message scheduling a retransmission of a failed transmission, of the first transmission and the second transmission, in a non-FD mode for the relay UE.

Aspect 36: The method of any of Aspects 22-35, wherein the feedback indicates that the first transmission and the second transmission are successful, wherein the DCI message is a first DCI message, wherein the base station is the destination node, and wherein the method further comprises: transmitting second DCI scheduling a third transmission between the source node and the relay UE and a fourth transmission between the relay UE and the base station, wherein the fourth transmission carries a transport block from the first transmission.

Aspect 37: The method of any of Aspects 22-36, wherein the feedback indicates that the first transmission and the second transmission are successful, wherein the DCI message is a first DCI message, wherein the base station is the source node, and wherein the method further comprises: transmitting a second DCI message scheduling a third transmission between the base station and the relay UE and a fourth transmission between the relay UE and the destination node, wherein the fourth transmission carries a transport block from the first transmission.

Aspect 38: The method of any of Aspects 22-37, wherein the source node is a source UE and the destination node is a destination UE.

Aspect 39: The method of Aspect 38, wherein the DCI message schedules transmission of first sidelink control information to schedule the first transmission between the source UE and the relay UE, and transmission of second sidelink control information to schedule the second transmission between the relay UE and the destination UE after the first transmission.

Aspect 40: The method of Aspect 38, wherein the DCI message schedules transmission of first sidelink control information to schedule the first transmission between the source UE and the relay UE, and transmission of second sidelink control information to schedule the second transmission between the relay UE and the destination UE, wherein the first transmission and the second transmission are in a full-duplex mode at the relay UE.

Aspect 41: The method of Aspect 40, wherein the second transmission carries a transport block previously received from the source UE.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a relay user equipment (UE), comprising:
   receiving, from a network entity, a single downlink control information (DCI) message scheduling a first transmission between a source node and the relay UE and a second transmission between the relay UE and a destination node, the single DCI message includes a first set of parameters for the first transmission and a second set of parameters for the second transmission; and
   transmitting, to the network entity, at least one of:
      feedback regarding at least one of the first transmission or the second transmission, or
      the second transmission.

2. The method of claim 1, wherein the first set of parameters and the second set of parameters each indicate at least one of:
   a data resource allocation,
   a modulation and coding scheme,
   a demodulation reference signal parameter,
   a precoder parameter,
   a transmit precoding matrix index,
   a beam indication,
   a downlink assignment index,
   a hybrid automatic repeat request process identifier,
   a new data indicator,
   a redundancy version index,
   a feedback resource,
   a first stage sidelink control information format,
   a second stage sidelink control information format,
   one or more component carrier or bandwidth part identifiers,
   an identifier of the source node, or
   an identifier of the destination node.

3. The method of claim 1, wherein the network entity is the source node, wherein the first transmission is received on a radio access link between the network entity and the relay UE, and wherein the single DCI message indicates a sidelink control information format for the second transmission between the relay UE and the destination node.

4. The method of claim 1, wherein the network entity is the source node, wherein the feedback is early feedback regarding a failure to receive the first transmission, and wherein the single DCI message indicates an uplink control channel resource for the early feedback.

5. The method of claim 1, wherein the network entity is the destination node, wherein the single DCI message indicates a sidelink control information format for the relay UE to schedule the second transmission, and wherein the method further comprises:
   transmitting sidelink control information using the sidelink control information format; and
   transmitting the second transmission via a radio access link between the network entity and the relay UE.

6. The method of claim 5, wherein the feedback indicates one or more failed transport blocks (TBs) or codeblock groups (CBGs) that the relay UE failed to receive in the first transmission.

7. The method of claim 6, wherein the feedback indicating the one or more failed TBs or CBGs is multiplexed with information regarding one or more successful TBs or CBGs that the relay UE received in the first transmission.

8. The method of claim 6, wherein transmitting the feedback further comprises:
   transmitting the feedback indicating the one or more failed TBs or CBGs in a dedicated transmission based at least in part on there being no successfully received TBs or CBGs in the first transmission.

9. The method of claim 1, wherein the first transmission and the second transmission are in a full-duplex (FD) mode for the relay UE.

10. The method of claim 1, wherein the feedback indicates that the first transmission and the second transmission are successful, wherein the single DCI message is a first single DCI message, wherein the network entity is the source node, and wherein the method further comprises:
    receiving a second single DCI message scheduling a third transmission between the network entity and the relay UE and a fourth transmission between the relay UE and the destination node, wherein the fourth transmission carries a transport block from the first transmission;
    receiving the third transmission; and
    transmitting the fourth transmission.

11. The method of claim 10, wherein the feedback indicates that only one of the first transmission and the second transmission is successful, wherein the single DCI message is a first single DCI message, and wherein the method further comprises:
    receiving a second single DCI message scheduling a retransmission of a failed transmission, of the first transmission and the second transmission, in a non-FD mode for the relay UE; and
    transmitting or scheduling the retransmission.

12. The method of claim 1, wherein the feedback indicates that the first transmission and the second transmission are successful, wherein the single DCI message is a first single DCI message, wherein the network entity is the destination node, and wherein the method further comprises:
    receiving a second single DCI message scheduling a third transmission between the source node and the relay UE and a fourth transmission between the relay UE and the network entity, wherein the fourth transmission carries a transport block from the first transmission;
    receiving the third transmission; and
    transmitting or scheduling the fourth transmission.

13. The method of claim 1, wherein the source node is a source UE, and the destination node is a destination UE.

14. The method of claim 1, wherein the single DCI message schedules transmission of first sidelink control information to schedule the first transmission between the source node and the relay UE, and transmission of second sidelink control information to schedule the second transmission between the relay UE and the destination node after the first transmission, and wherein the method further comprises:
 transmitting the first sidelink control information and the second sidelink control information.

15. The method of claim 1, wherein the single DCI message schedules transmission of first sidelink control information to schedule the first transmission between the source node and the relay UE, and transmission of second sidelink control information to schedule the second transmission between the relay UE and the destination node, wherein the first transmission and the second transmission are in a full-duplex mode at the relay UE, and wherein the method further comprises:
 transmitting the first sidelink control information and the second sidelink control information.

16. A method of wireless communication performed by a network entity, comprising:
 transmitting a single downlink control information (DCI) message scheduling a first transmission between a source node and a relay user equipment (UE) and a second transmission between the relay UE and a destination node, the single DCI message includes a first set of parameters for the first transmission and a second set of parameters for the second transmission; and
 receiving, from the relay UE, at least one of:
  feedback regarding at least one of the first transmission or the second transmission, or
  the second transmission from the relay UE.

17. The method of claim 16, wherein the first set of parameters and the second set of parameters each indicate at least one of:
 a data resource allocation,
 a modulation and coding scheme,
 a demodulation reference signal parameter,
 a precoder parameter,
 a transmit precoding matrix index,
 a beam indication,
 a downlink assignment index,
 a hybrid automatic repeat request process identifier,
 a new data indicator,
 a redundancy version index,
 a feedback resource,
 a first stage sidelink control information format,
 a second stage sidelink control information format,
 one or more component carrier or bandwidth part identifiers,
 an identifier of the source node, or
 an identifier of the destination node.

18. The method of claim 16, wherein the network entity is the source node, wherein the first transmission is on a radio access link between the network entity and the relay UE, and wherein the single DCI message indicates a sidelink control information format for the second transmission between the relay UE and the destination node.

19. The method of claim 16, wherein the network entity is the source node, wherein the feedback is early feedback regarding a failure to receive the first transmission, and wherein the single DCI message indicates an uplink control channel resource for the early feedback.

20. The method of claim 16, wherein the network entity is the destination node, wherein the single DCI message indicates a sidelink control information format for the relay UE to schedule the second transmission, and wherein the second transmission is received via a radio access link between the network entity and the relay UE.

21. The method of claim 20, wherein the feedback indicates one or more failed transport blocks (TBs) or codeblock groups (CBGs) that the relay UE failed to receive in the first transmission.

22. An apparatus for wireless communication at a relay user equipment (UE), comprising:
 one or more memories; and
 one or more processors, coupled to the one or more memories, configured to:
 receive, from a network entity, a single downlink control information (DCI) message scheduling a first transmission between a source node and the relay UE and a second transmission between the relay UE and a destination node, the single DCI message includes a first set of parameters for the first transmission and a second set of parameters for the second transmission; and
 transmit, to the network entity, at least one of:
  feedback regarding at least one of the first transmission or the second transmission, or
  the second transmission.

23. The apparatus of claim 22, wherein the first set of parameters and the second set of parameters each indicate at least one of:
 a data resource allocation,
 a modulation and coding scheme,
 a demodulation reference signal parameter,
 a precoder parameter,
 a transmit precoding matrix index,
 a beam indication,
 a downlink assignment index,
 a hybrid automatic repeat request process identifier,
 a new data indicator,
 a redundancy version index,
 a feedback resource,
 a first stage sidelink control information format,
 a second stage sidelink control information format,
 one or more component carrier or bandwidth part identifiers,
 an identifier of the source node, or
 an identifier of the destination node.

24. The apparatus of claim 22, wherein the network entity is the source node, wherein the first transmission is received on a radio access link between the network entity and the relay UE, and wherein the single DCI message indicates a sidelink control information format for the second transmission between the relay UE and the destination node.

25. The apparatus of claim 22, wherein the network entity is the source node, wherein the feedback is early feedback regarding a failure to receive the first transmission, and wherein the single DCI message indicates an uplink control channel resource for the early feedback.

26. The apparatus of claim 22, wherein the network entity is the destination node, wherein the single DCI message indicates a sidelink control information format for the relay UE to schedule the second transmission, and wherein the one or more processors are further configured to:
 transmit sidelink control information using the sidelink control information format; and
 transmit the second transmission via a radio access link between the network entity and the relay UE.

27. The apparatus of claim 26, wherein the feedback indicates one or more failed transport blocks (TBs) or codeblock groups (CBGs) that the relay UE failed to receive in the first transmission.

28. The apparatus of claim 27, wherein the feedback indicating the one or more failed TBs or CBGs is multiplexed with information regarding one or more successful TBs or CBGs that the relay UE received in the first transmission.

29. An apparatus for wireless communication at a network entity, comprising:
   a memory one or more memories; and
   one or more processors, coupled to the memory one or more memories, configured to:
      transmit a single downlink control information (DCI) message scheduling a first transmission between a source node and a relay user equipment (UE) and a second transmission between the relay UE and a destination node, the single DCI message includes a first set of parameters for the first transmission and a second set of parameters for the second transmission; and
      receive, from the relay UE, at least one of:
         feedback regarding at least one of the first transmission or the second transmission, or
         the second transmission from the relay UE.

30. The apparatus of claim 29, wherein the first set of parameters and the second set of parameters each indicate at least one of:
   a data resource allocation,
   a modulation and coding scheme,
   a demodulation reference signal parameter,
   a precoder parameter,
   a transmit precoding matrix index,
   a beam indication,
   a downlink assignment index,
   a hybrid automatic repeat request process identifier,
   a new data indicator,
   a redundancy version index,
   a feedback resource,
   a first stage sidelink control information format,
   a second stage sidelink control information format,
   one or more component carrier or bandwidth part identifiers,
   an identifier of the source node, or
   an identifier of the destination node.

* * * * *